United States Patent [19]
Bonte et al.

[11] Patent Number: 5,438,499
[45] Date of Patent: Aug. 1, 1995

[54] SWITCHING REGULATOR CIRCUIT USING MAGNETIC FLUX-SENSING

[75] Inventors: Anthony K. Bonte, Campbell; Carl T. Nelson, San Jose, both of Calif.

[73] Assignee: Linear Technology Corp., Milpitas, Calif.

[21] Appl. No.: 266,092

[22] Filed: Jun. 27, 1994

Related U.S. Application Data

[63] Continuation of Ser. No. 125,429, Sep. 22, 1993, abandoned, which is a continuation of Ser. No. 786,718, Nov. 1, 1991, Pat. No. 5,305,192.

[51] Int. Cl.⁶ .......................................... H02M 3/335
[52] U.S. Cl. ...................................... 363/21; 323/285
[58] Field of Search ...................... 323/285; 363/21; H02M 3/28, 3/335

[56] References Cited

U.S. PATENT DOCUMENTS

| | | | |
|---|---|---|---|
| 4,467,406 | 8/1984 | Hattori et al. | 363/19 |
| 4,688,158 | 8/1987 | Peterson et al. | 363/21 |
| 4,823,070 | 4/1989 | Nelson | 323/285 |
| 4,864,480 | 9/1989 | Melcher | 363/21 |
| 5,138,543 | 8/1992 | Harm et al. | 363/21 |

FOREIGN PATENT DOCUMENTS

| | | | |
|---|---|---|---|
| 10816 | 1/1982 | Japan | G06F 1/56 |

OTHER PUBLICATIONS

"LT1070 Design Manual", *Linear Technology Corporation Application Note 19*, by C. Nelson, Linear Technology Corporation, Milpitas, Calif., Jun. 1986, pp. 34–38.
"Unitrode Programmable, Off-Line, PWM Controller, UC1840/UC2840/UC3840", *Unitrode Linear Integrated Circuits Data and Applications Handbook*, Apr. 1990, Merrimack, N.H., pp. 4-144-4-151.
"Unitrode Programmable, Off-Line, PWM Controller, UC1841/UC2841/UC3841", *Unitrode Linear Integrated Circuits Data and Applications Handbook*, Apr. 1990, Merrimack, N.H., pp. 4-152-4-159.
"Unitrode Current Mode Off-Line, PWM Controller, UC1842/3/4/5,UC2842/3/4/5,UC3842/3/4/5", *Unitrode Linear Integrated Circuits Data and Applications Handbook*, Apr. 1990, Merrimack, N.H., pp. 4-160-4-165.
"A 25 Watt Off-Line Flyback Switching Regulator", Unitrode Integrated Circuits Corporation Application Note U-96A, *Unitrode Linear Integrated Circuits Data and Applications Handbook*, Apr. 1990, Merrimack, N.H., pp. 9-47-9-51.
"PWR-SMP210, PWM Power Supply IC, 120/220 VAC Input, Isolated, Regulated DC Output", *Power Integrations Inc. Power Supply IC Product Literature*, Oct. 1990, Mountain View, Calif., pp. 1–12.
"PWR-SMP520, PWM Controller IC, 120/220 VAC Input", *Power Integrations Inc. Power Supply IC Product Literature*, Oct. 1990, Mountain View, Calif., pp. 1–12.
"Universal Input Switchmode Controller, Si9210", *Siliconix Incorporated Power Products Data Book*, 1990/1991, Santa Clara, Calif., pp. 5-41-5-46.
"Designing Low-Power Off-Line Flyback Converters Using the Si9120 Switchmode Controller IC", by C. Varga, *Siliconix Incorporated Application Note AN90-2*, *Siliconix Incorporated Power Products Data Book*, 1990/1991, Santa Clara, Calif., pp. 9-26-9-38.
"Tantalum Capacitor Cuts Power Supply's Size", by Terrence Lynch, *Design News*, Feb. 10, 1992, pp. 163–164.

*Primary Examiner*—Jeffrey L. Sterrett
*Attorney, Agent, or Firm*—Fish & Neave; Mark D. Rowland; Robert W. Morris

[57] ABSTRACT

Control circuits for a switching voltage regulator circuit which uses magnetic flux sensing are provided. These circuits can be used to improve output voltage regulation by reducing parasitic effects inherently present in magnetic flux-sensed feedback switching voltage regulator designs.

12 Claims, 32 Drawing Sheets

SWITCHING REGULATOR CIRCUIT USING MAGNETIC FLUX-SENSING

This is a continuation of application Ser. No. 08/125,429, filed Sep. 22, 1993, now abandoned entitled SWITCHING REGULATOR CIRCUIT USING MAGNETIC FLUX-SENSING, which is a continuation of application Ser. No. 07/786,718 filed Nov. 1, 1991 entitled SWITCHING REGULATOR CIRCUIT USING MAGNETIC FLUX-SENSING, now U.S. Pat. No. 5,305,192.

BACKGROUND OF THE INVENTION

The present invention relates to switching voltage regulator circuits. More particularly, the present invention relates to switching voltage regulator circuits that use magnetic flux-sensing to regulate the output voltage of the regulator circuit.

The function of a voltage regulator is to provide a predetermined and substantially constant output voltage from an unregulated input voltage. Switching regulator circuits (hereinafter "switching regulators") typically use a power transistor as a switch to provide a pulsed flow of current to a network of inductive and capacitive energy storage elements which smooth the switched current pulses into a continuous and regulated output voltage. Switching regulators can provide output voltages which are less than, greater than, or of opposite polarity to the unregulated input voltage, depending on the mode of operation of the switching regulator. They often can be implemented to a large extent using integrated circuit components, which advantageously reduce the size and complexity of the overall switching regulator circuit.

Switching regulators are commonly used in power supply circuits. Switching-regulator power supplies generally can be classified into three categories, depending on the type of output circuitry used. These classes are: (A) single-ended inductor circuits, (B) diode-capacitor circuits, and (C) transformer-coupled circuits. A specific type of transformer-coupled switching regulator power supply is the offline power supply. Offline power supply circuits generate one or more DC output voltages from an AC input signal. The most desirable form of the offline power supply is known as a universal supply, which can accept an input ranging from 85 VAC to 270 VAC and therefore can operate with various power systems around the world without alterations or switches.

Commercially sold offline power supplies generally must provide DC outputs that comply with regulation and isolation requirements defined by various worldwide safety/regulatory agencies. Of particular importance are standards set by Verband Deutscher Elecktrotechniker, commonly referred to as the "VDE specifications." The VDE specifications, which have their origin in Germany, are generally regarded as the most stringent in the world. Therefore, a power supply which meets the VDE specifications usually will meet applicable safety regulation codes anywhere in the world.

The output voltage of an offline power supply is usually regulated by a feedback signal indicative of the output voltage. The feedback signal is used to control the duty cycle of the switching power transistor. There are various ways to provide such a feedback signal. One way is to sample the output voltage directly (e.g., by using a resistor network). This method provides the most accurate output voltage regulation. The problem with this type of feedback mechanism is that there is no isolation between the input and output circuits of the power supply, which may be operating at significantly different voltage levels. An opto-coupler can be used in the feedback signal path to provide isolation, but at the expense of numerous discrete components, large board space requirements, high cost, design problems associated with loop stability, spurious noise pick-up, start-up problems and output overshoot. Furthermore, opto-couplers age and thus this may cause loop response problems or loss of output regulation.

An alternate and simpler method for providing a feedback signal while maintaining isolation between the input and output circuits of the power supply is to employ what is commonly referred to as magnetic flux-sensing. Magnetic flux sensing is the generation of a feedback signal by sensing the magnetic flux in an inductive element (e.g., by sensing the flux in the core of a transformer). Magnetic flux sensing can be used in offline power supplies configured in a flyback converter topology, and may be used in other topologies as well. In a flyback converter topology, the flyback voltage on the primary winding side of the transformer during "switch off" time is sensed and used to regulate the output voltage. Ideally, the output voltage (VOUT) is related to the primary flyback voltage (VPRI) during "switch off" time by the relationship:

$$VPRI = (VOUT + Vf)/N$$

where Vf is the forward voltage of an output diode usually connected in series with the secondary winding and N is the transformer turns ratio from secondary to primary.

It is difficult to derive a feedback signal directly from the primary flyback voltage because this voltage is typically several hundred volts. A common practice is to provide a lower voltage auxiliary (or bias) winding from which the feedback signal is generated. In addition, this bias winding is convenient to use as a power winding for powering circuitry of the switching regulator circuit or other circuitry.

Magnetic flux-sensing simplifies the design of offline power supplies by minimizing the total number of components required while providing isolation between the input and output circuitry. Improved isolation can result in greater safety and reliability. However, although magnetic flux-sensing has been used in the past, regulator circuits incorporating it have had poor output voltage regulation due to the parasitics inherently present in a transformer-coupled design. These parasitics are especially troublesome in transformers which are designed to meet stringent safety and isolation requirements of certain industry standards, such as the above-discussed VDE specifications.

In view of the foregoing, it would be desirable to be able to provide a transformer-coupled switching voltage regulator circuit which uses magnetic flux sensing and which does not suffer from poor output voltage regulation due to the parasitics inherently present in a transformer-coupled design.

SUMMARY OF THE INVENTION

It is therefore an object of the present invention to provide control and feedback currents for a transformer-coupled switching voltage regulator circuit which uses magnetic flux sensing and which does not suffer from poor output voltage regulation due to the parasitics inherently present in such a design.

This and other objects of the present invention are accomplished by a switching voltage regulator circuit which includes a variety of novel circuits, the principles of which are applicable to both current-mode and voltage-mode switching regulators. These circuits include a unique sampling error amplifier circuit for tracking a magnetic flux-sensed feedback signal and for sampling and storing an indication of the feedback signal voltage at a particular point in time. The sampling time is selected to reduce feedback errors resulting from parasitic impedances in the transformer and output circuitry of the switching regulator. A unique load compensation circuit is included for providing current compensation to cancel additional current-dependent errors caused by the parasitic impedances in the output circuitry of the switching regulator. Unique bias detecting circuits are also provided for detecting if the voltage on the control terminal of the switch exceeds a first bias threshold or falls below a second bias threshold and for sending a signal to the switch control circuitry when such a condition occurs to prevent the switch from being turned on under undesirable bias conditions. The above-described circuits can be incorporated together into a single switching voltage regulator circuit, or can be used in various combinations with other types of circuitry. In a preferred embodiment, the sampling error amplifier circuit, the load compensation circuit, and the bias detecting circuit are implemented in a single integrated circuit switching regulator control device.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

In order to understand how the present invention improves the regulation performance of switching voltage regulators of the magnetic flux-sensing type, it is first necessary to understand generally how the transformer-coupled output circuitry of a switching regulator using magnetic flux-sensing functions. With this understanding, the problems which create a poorly regulated output and how previous circuits and methods have failed to solve these problems will be apparent. Although the following discussion will be centered on the flyback converter switching topology, it will be apparent to one of ordinary skill in the art that the principles and circuitry discussed apply to other transformer-coupled switching topologies as well.

Figure 1:
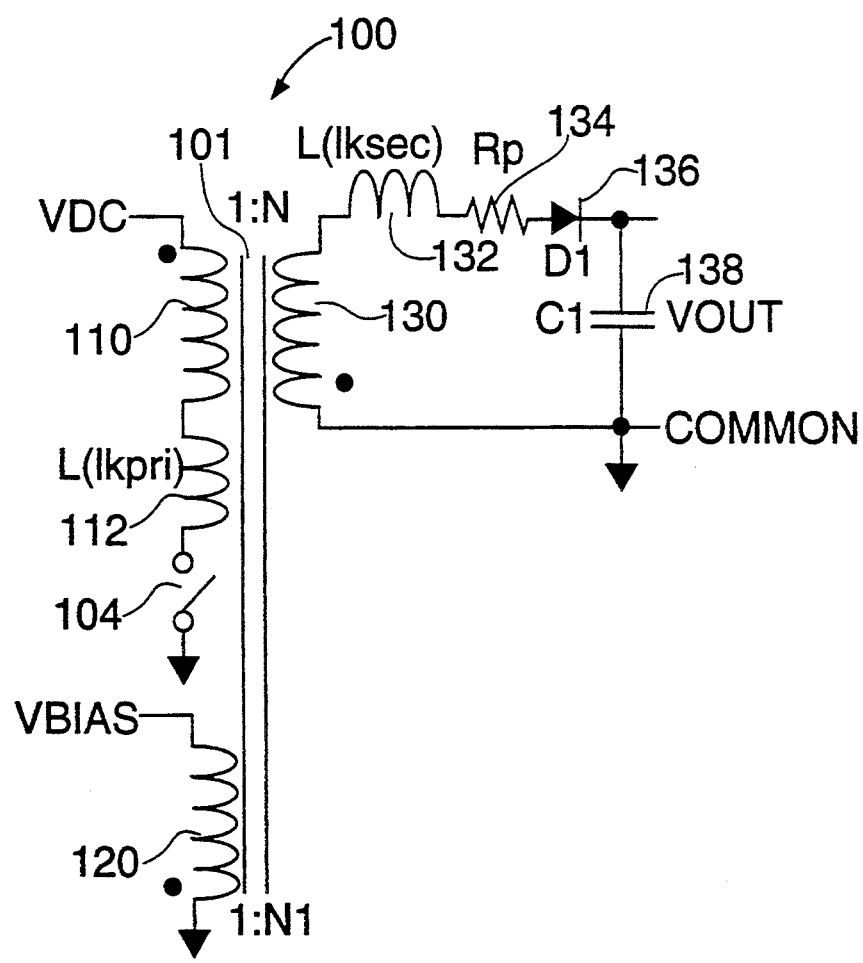
FIG. 1 is a simplified schematic diagram of the topology of a conventional flyback converter using magnetic flux-sensing.

FIG. 1 shows a simplified schematic diagram of a conventional switching voltage integrated circuit 100 configured in a flyback converter topology with magnetic flux-sensing (hereafter referred to as flyback converter 100). Flyback converter 100 includes transformer 101 having primary winding 110, bias winding 120 and secondary winding 130. The transformer turns ratio from secondary winding 130 to primary winding 110 is N, while the transformer turns ratio from secondary winding 130 to bias winding 120 is N1. The transformer turns ratio from bias winding 120 to primary winding 110 is N2. A feedback signal is derived from the voltage, VBIAS, on bias winding 120. This feedback signal is used to control the on and off duty cycle of switch 104. Switch 104 is normally a power transistor. On the primary side of transformer 101, in series with primary winding 110, is primary leakage inductor 112, L(lkpri). Primary leakage inductor 112 represents the parasitic inductance on the primary side of transformer 101.

The regulated output of flyback converter 100 is taken from the secondary side of transformer 101. On this side of transformer 101, in series with secondary winding 130, is secondary leakage inductor 132, L(lksec). Secondary leakage inductor 132 represents the parasitic inductance on the secondary side of transformer 101. Also in series with secondary winding 130 are lumped sum equivalent secondary resistor 134, output diode 136 and output capacitor 138. Lumped sum equivalent secondary resistor 134 represents the lumped sum equivalent resistance of the combination of secondary winding resistance, the output diode resistance and the output capacitance resistance.

Flyback converter 100 works as follows. When switch 104 "turns on", primary winding 110 sees the input voltage VDC and secondary 130 and bias 120 windings go to negative voltages. Current builds in primary winding 110 as transformer 101 stores energy. When switch 104 "turns off", the voltage across the switch flies back to a large voltage (a clamp level as controlled by a snubber network not shown in FIG. 1) until the energy in primary leakage inductor 112 dissipates. Leakage inductance is one of the main parasitic elements in a flux-sensed converter and is modeled as an inductor in series with the primary winding of the transformer. Leakage inductance is also present on the secondary winding and is modeled as an inductor in series with the secondary winding (see inductor 132 in FIG. 1). These parasitic leakage inductances contribute to changes in the bias winding voltage, and thus the output voltage, with increasing load current. Various winding techniques exist for reducing the leakage inductances of a transformer on both the primary and secondary windings. However, VDE requirements for safety and isolation impact these techniques severely and thus limit their effectiveness.

The energy stored in transformer 101 transfers to secondary winding 130 and bias winding 120 during "switch off" time. The voltage VBIAS across bias winding 120 during "switch off" time is set by the DC output voltage, the forward voltage of output diode 136 and the turns ratio N1 of the transformer (after the energy in the leakage inductance spike of the primary dissipates). This relationship holds until the energy in transformer 101 drops to zero (discontinuous mode) or the switch turns on again (continuous mode). Therefore, the voltage on bias winding 120 is only valid as a representation of the output voltage while secondary winding 130 is delivering current.

Figure 2A:
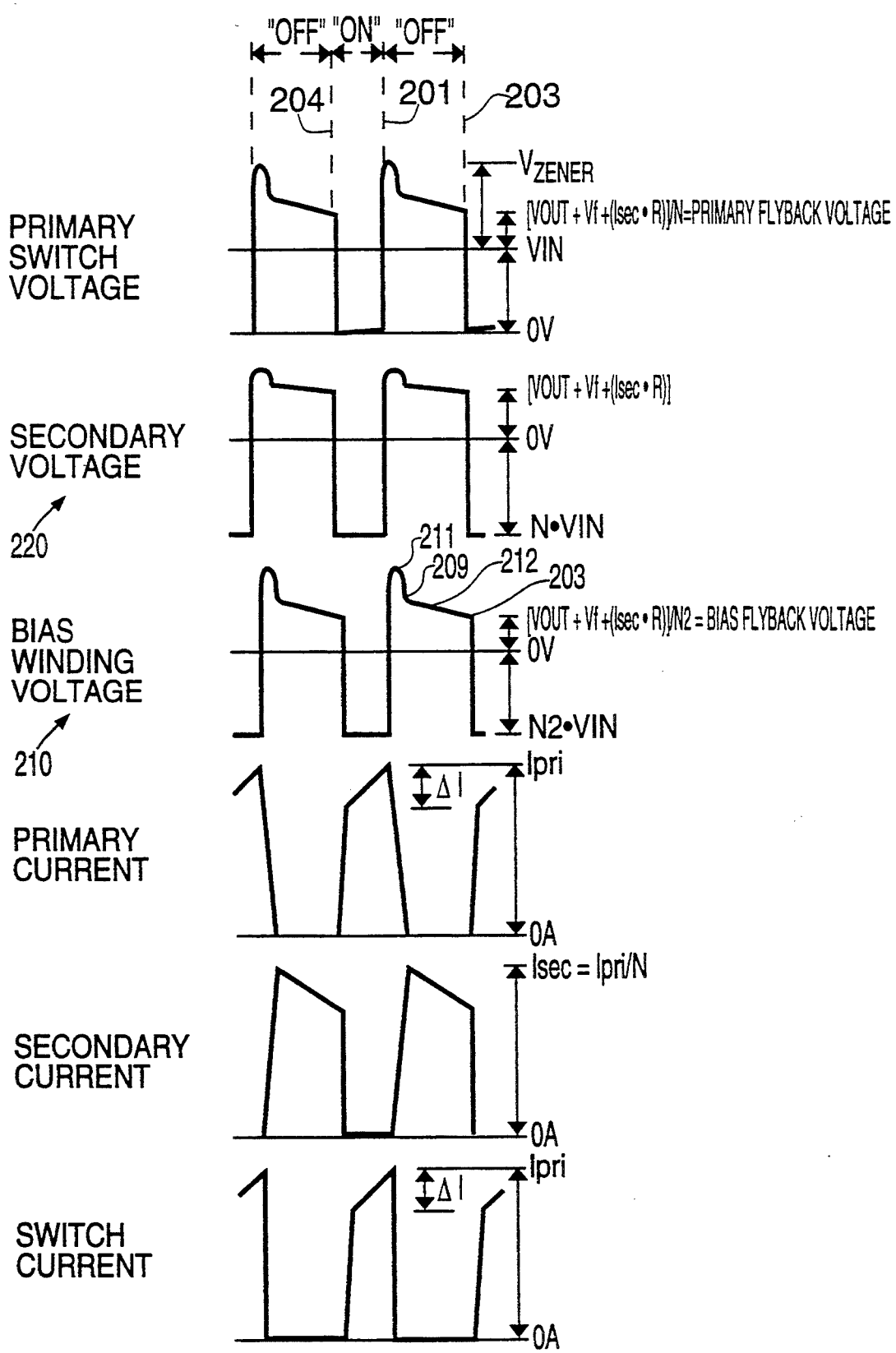
FIG. 2A illustrates the relationships among primary, secondary and bias winding voltages and currents in a conventional flyback converter operated in a continuous switching mode.
Figure 2B:
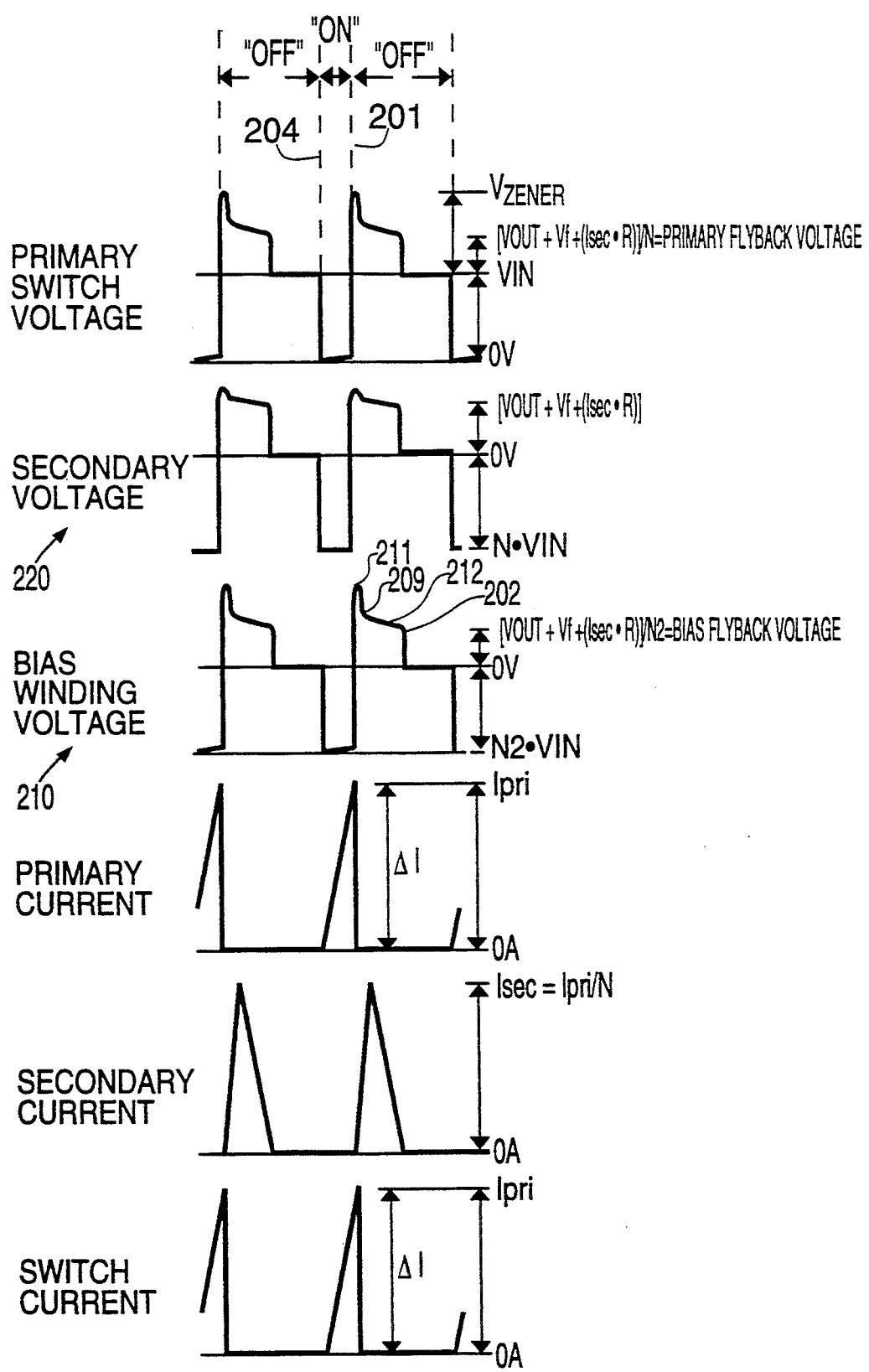
FIG. 2B illustrates the relationships among primary, secondary and bias winding voltages and currents in a conventional flyback converter operated in a discontinuous switching mode.

A simplified conceptual comparison of the relationships among primary, secondary and bias winding voltages, and among respective currents in a conventional flyback converter operated in a continuous switching mode is shown in FIG. 2A. FIG. 2B shows the same voltages and currents in a flyback converter operated in a discontinuous mode. Not shown in FIGS. 2A and 2B is the current through the snubber diode network typically connected to the primary side of the transformer. Although the bias winding flyback voltage (see waveforms 210 in both FIGS. 2A and 2B) is a representation of the output voltage, its value changes with time. For a short period following the leakage inductance spike (see spikes 211 in both FIGS. 2A and 2B), the bias winding flyback voltage decreases due to nonlinearities and parasitics present in the transformer (see non-linear regions 209 in FIGS. 2A and 2B).

Following this short time period of nonlinear behavior is a period where the bias winding flyback voltage decreases linearly (see linear regions 212 in both FIGS. 2A and 2B). This behavior is easily explained. Current flow in the secondary decreases linearly at a rate determined by the voltage across the secondary and the inductance of the secondary. The parasitic secondary leakage inductance appears as an impedance in series with the secondary winding. In addition, parasitic resistances exist in the secondary winding, the output diode and the output capacitor. These impedances can be combined to form a lumped sum equivalent and cause a voltage drop as secondary current flows. This voltage drop, which decreases with decreasing current, is coupled from the secondary to the bias winding, such that the bias winding flyback voltage is affected by the voltage drop as well. This voltage drop is largest at the beginning of the "switch off" time. The beginning of "switch off" time is shown in FIGS. 2A and 2B by time point 201. In a continuous mode, the voltage drop due to the lumped sum equivalent impedance is smallest just prior to the switch turning on again (see time point 203 in FIG. 2A). In a discontinuous mode, the voltage drop is smallest just prior to the point when all energy stored in the transformer core is depleted (see time point 202 in FIG. 2B). These voltage drops become more significant as the output is loaded more heavily.

Thus, the bias winding voltage provides the most accurate representation of the output voltage just prior to the point in time when, in a continuous mode, the switch turns on again and the bias winding voltage goes negative (time point 203 in FIG. 2A), or, in a discontinuous mode, all transformer energy is used up and the bias winding voltage collapses to zero (time point 202 in FIG. 2B). These points in time also represent the smallest forward voltage for the output diode. It is possible to rewrite the relationship between the output voltage VOUT and the bias winding voltage VBIAS as:

$$VBIAS = (VOUT + Vf + Isec \bullet R)/N1$$

where Vf is the forward voltage of the output diode, Isec is the current flowing in the secondary, R is the lumped equivalent secondary parasitic impedance and N1 is the transformer turns ratio from the secondary to the bias winding. It is apparent that even though time point 202 or 203 results in the most accurate representation of the output voltage, the voltage sensed by the bias winding is still off from the "true" output voltage by the amount Isec•R/N1.

Figure 3:
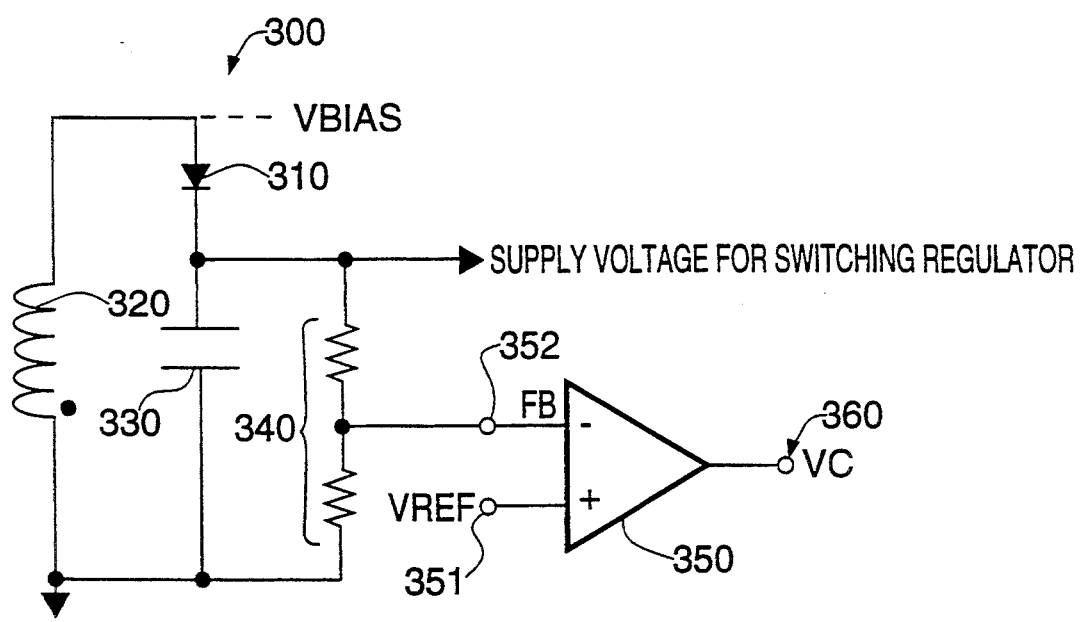
FIG. 3 is a schematic diagram of a conventional feedback scheme using magnetic flux-sensing.

The typical feedback scheme for conventional switching regulators employing magnetic flux-sensing is shown in FIG. 3. Magnetic flux-sensing feedback circuit 300 includes bias diode 310 in series with bias winding 320 and bias capacitor 330 to ground. The voltage on bias capacitor 330 is then attenuated through bias resistor divider 340 and the resultant feedback signal (FB) is applied to feedback terminal 352 of error amplifier 350. Feedback signal FB is then compared with an internal reference voltage (VREF) applied to terminal 351 and a switch control signal (VC) is generated at the output terminal 360 of error amplifier 350. The diode/capacitor (310/330) combination is used because a positive voltage must always be present at feedback terminal 352 of error amplifier 350. Otherwise, when the bias winding voltage collapses (in discontinuous mode) or goes negative due to the switch turning on (in continuous mode), the output would become unregulated. The diode and capacitor combination (310/330) form a peak detector circuit which will place the largest value of the bias winding voltage onto bias capacitor 330 before bias diode 310 reverse biases. The voltage on bias capacitor 330 is also generally used as the supply voltage for the switching regulator.

One error confronted by the user of the flux-sensed topology shown in FIG. 3 is that the feedback circuitry 300 also peak detects the primary leakage inductance spike superimposed on the bias winding flyback voltage (see leakage inductance spike 211 in bias winding voltage waveform 210 in FIGS. 2A and 2B). Therefore, the feedback signal FB presented to terminal 352 of error amplifier 350 will be artificially large and the output voltage will sag as a result of the voltage artifact.

Various methods have been used in the past to eliminate the effects of the leakage inductance spike. These methods have included external filters, blanking circuits and coupled inductor schemes. These methods, however, have suffered from many disadvantages including the requirement of external components, large efficiency loss associated with the additional circuitry, complexity and limited performance improvement.

In addition, there are other problems associated with magnetic flux-sensing that hinder the above-described feedback technique. To begin with, assume that some technique has been used to blank the leakage inductance spike. The feedback scheme using the diode/capacitor combination with a resistor divider network will still suffer from a peak detection problem. The bias winding flyback voltage is not constant during "switch off" time. As previously discussed, this voltage actually decreases during the period of "switch off" time due to nonlinear transformer behavior and voltage drops due to parasitic secondary leakage inductance and resistances as discussed previously (see region 212 in bias winding waveform 210 in FIGS. 2A and 2B). Therefore, even though the leakage inductance spike has been eliminated, the diode/capacitor combination will peak detect the voltage immediately following the leakage inductance spike as this is the highest level in the remaining flyback waveform. The most accurate representation of the output voltage is not at this peak voltage level, but just prior to all transformer energy being used up (in discontinuous mode) or just prior to the switch turning on again (in continuous mode). When peak sensing is used, the output voltage sags due to this discrepancy in error voltage and becomes worse with increasing load current.

The present invention provides various circuits for overcoming the above-discussed problems in a magnetic flux-sensed topology. As a result, the line and load regulation of a switching regulator can be improved by incorporating one or more aspects of the present invention. The present invention includes, alone or in combination, a unique error amplifier, a unique load regulation compensation circuit, a unique gate bias detect circuit and other unique circuitry.

Figure 4A:
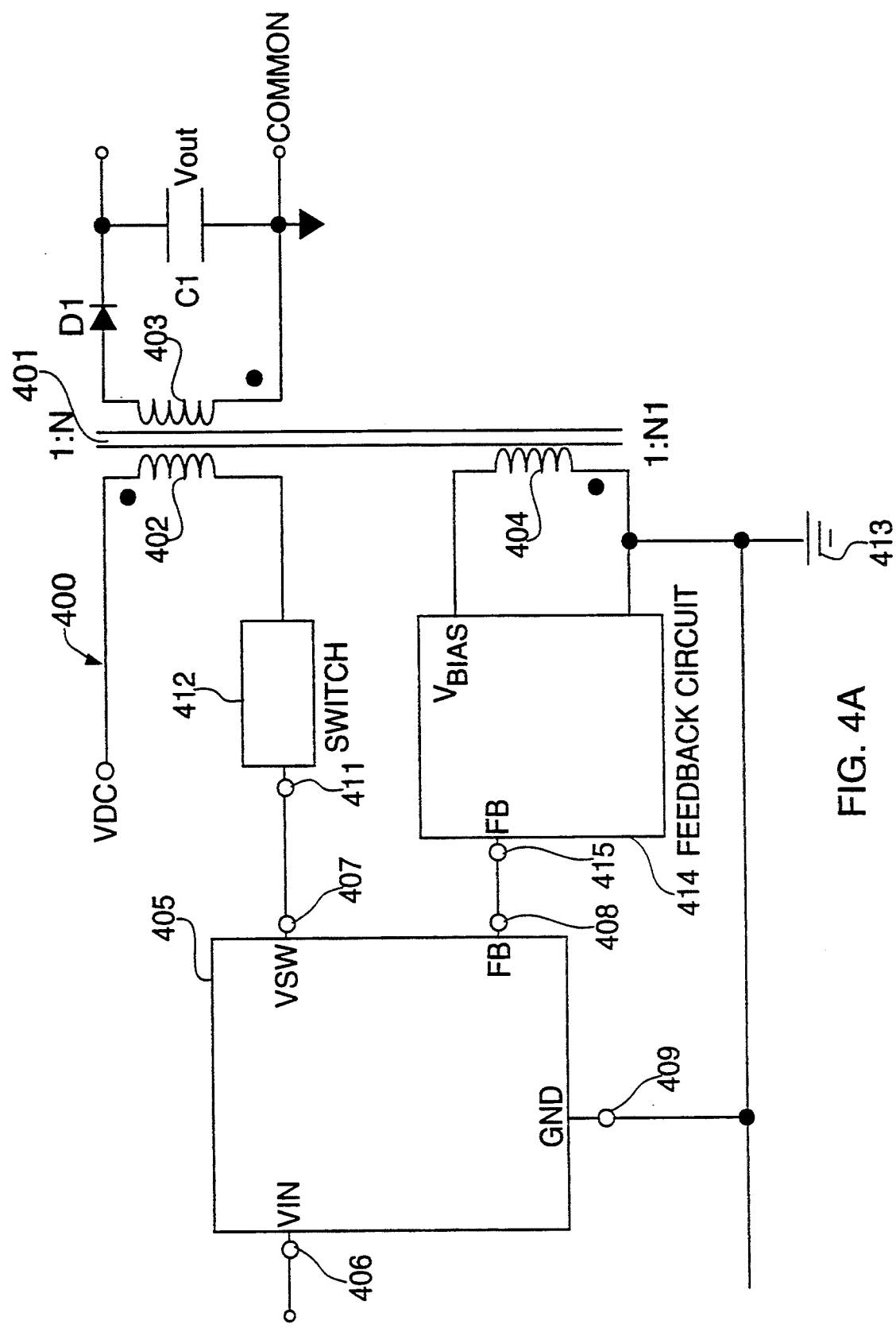
FIG. 4A is a block diagram of an illustrative application circuit in which the present invention can be used in a flyback converter switching configuration.

FIG. 4A shows a simplified block diagram of a first illustrative application circuit 400 in which the circuits of the present invention can be used. The switching configuration shown is a flyback converter configuration. It includes transformer 401 with primary winding 402, secondary winding 403 and bias winding 404. It also includes a switching regulator control circuit 405 having a supply voltage terminal 406 whose voltage is derived from bias winding 404, a switching terminal 407, a feedback terminal 408, and a ground terminal 409. Input voltage VDC is an unregulated or poorly regulated DC voltage, such as may be generated by the rectifier circuitry of an offline power supply. Switching regulator control circuit 405 is connected, by way of switching terminal 407, to a control terminal 411 of switching circuit 412. Switching circuit 412 is also connected to the other end of primary winding 402 and, depending on its implementation, possibly also to ground 413. Switching regulator control circuit 405 provides a control signal to the control terminal 411 of switching circuit 412 to control the on and off duty cycle of the switching circuit. Switching circuit 412 may be implemented in various ways. For example, switching circuit 412 may comprise an FET connected as described hereafter in connection with FIGS. 10 and 12. Switching regulator control circuit 405 and switching circuit 412 may have terminals in addition to those shown. Feedback circuit 414 provides a feedback signal at terminal 415 connected to feedback terminal 408 of switching regulator control circuit 405. The feedback signal is derived by sensing the magnetic flux in the core of transformer 401 using bias winding 404. Application circuit 400 also includes output circuitry comprising diode D1 and capacitor C1. A more detailed discussion of switching regulator control circuit 405, switching circuit 412, and feedback circuit 414 of application circuit 400 will be presented below.

Figure 4B:
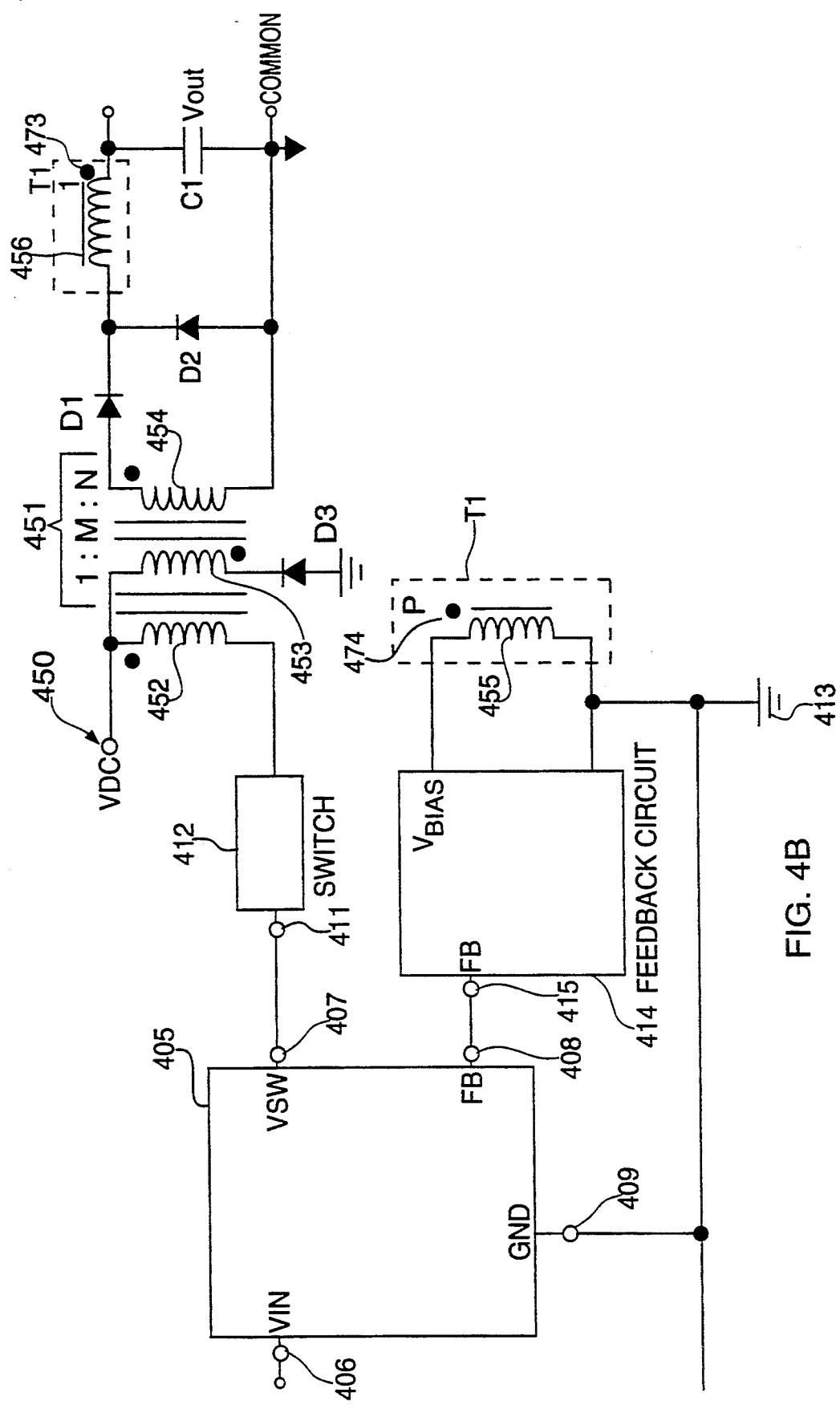
FIG. 4B is a block diagram of an illustrative application circuit in which the present invention can be used in a forward converter switching configuration.

FIG. 4B shows a simplified block diagram of a second illustrative application circuit 450 in which the present invention can be used. The switching configuration shown is a "forward converter" configuration. It includes transformer 451 with primary winding 452, and M and N windings 453 and 454. Supply voltage terminal 406 receives a voltage derived from winding 455. Switching regulator control circuit 405 is connected, by way of switching terminal 407, to switching circuit 412 which is in turn connected to the other end of primary winding 452. The inputs of feedback circuit 414 are connected to winding 455 of a transformer T1, which corresponds to a bias winding of a transformer and which functions as the feedback winding in the regulator circuit. Winding 455 is coupled to a second winding 456 of transformer T1 included in the output circuitry of the switching regulator circuit along with diodes D1 and D2 and capacitor C1. Dots 473 and 474 are provided to indicate the phase relationship of windings 455 and 456. The operation of a forward converter is well known in the art.

Although the discussion below will be focused on the first illustrative application circuit shown in FIG. 4A (the "flyback converter configuration"), the usefulness and operation of the present invention in the second illustrative application circuit shown in FIG. 4B (the "forward converter configuration") will be apparent to those of ordinary skill in the art. It also will be apparent to those of ordinary skill in the art that there are still other application circuits, besides those shown in FIGS. 4A and 4B, into which the present invention can be incorporated.

Figure 5:
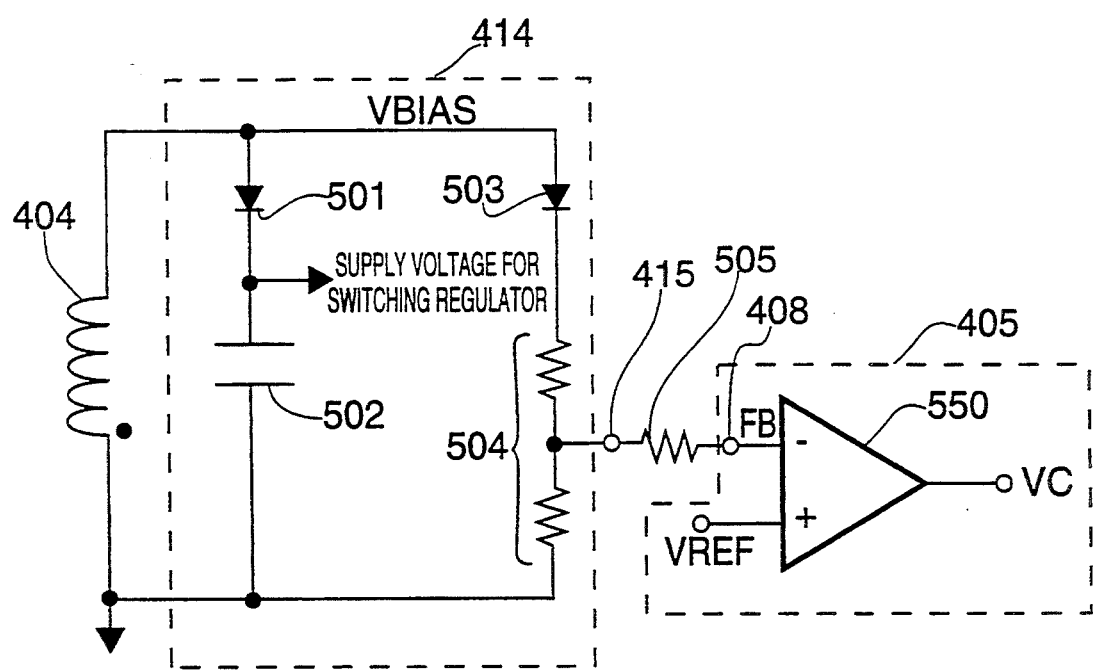
FIG. 5 is a schematic diagram of an exemplary embodiment of feedback circuit 414 of FIGS. 4A and 4B.

A more detailed schematic of an exemplary embodiment of feedback circuit 414 is shown in FIG. 5. In contrast to the typical peak detection feedback scheme for previous switching regulators employing magnetic flux-sensing (FIG. 3), feedback circuit 414 comprises instead a voltage follower network which provides a feedback signal that follows changes in the voltage across bias winding 404. Thus, the bias winding voltage in waveform 210 of FIGS. 2A and 2B is reflected by the feedback signal. As shown in FIG. 5, a diode 503 and resistor divider network 504 are connected in a serial loop with bias winding 404. The output 415 of feedback circuit 414, taken from a tap point in resistor network 504, is coupled to feedback terminal 408 of switching voltage regulator control circuit 405. In switching voltage regulator control circuit 405, this error signal can be fed into the input of an error amplifier 550 for example, so as to regulate the bias voltage.

The purpose of having diode 503 in series with bias winding 404 is now not to peak detect, but to prevent feedback pin FB (input to the error amplifier) from being pulled negative and potentially forward biasing a semiconductor substrate in an integrated circuit implementation of switching regulator control circuit 405 when the bias winding changes polarity with "switch turn-on". A Schottky clamp (not shown in FIG. 5) on feedback pin FB and which is internal to switching regulator 405 can also be used to prevent any negative going transients spikes due to parasitic capacitive coupling effects. Feedback circuit 414 can also optionally include diode 501 and capacitor 502 for supplying voltage for operating switching regulator 405 or other circuitry.

FIG. 5 shows that a resistor 505 may be interconnected between terminal 415 of feedback circuit 414 and terminal 408 of switching regulator control circuit 405. Such a resistor can be inserted to provide load current compensation, as discussed more fully below in connection with FIG. 8.

Aspects of the present invention include unique circuitry of switching regulator control circuit 405 designed to take advantage of a magnetic flux-sensed feedback signal which follows changes in the voltage across a feedback (e.g., a bias winding or inductor winding) winding as current flow in the output circuit changes. As an introduction to these and other unique circuits of switching voltage regulator control circuit 405, FIGS. 6A–6D provide illustrative simplified diagrams of various arrangements and interconnections of certain functional circuit blocks within switching voltage regulator control circuit 405. More particularly, FIGS. 6A–6D show block diagrams of four alternative embodiments of switching regulator control circuit 405 of FIGS. 4A and 4B, each including a sampling error amplifier circuit block 610, a load regulation compensation circuit block 620, a logic/drive circuit block 630, a voltage to duty cycle converter block 635, a gate bias detect circuit block 640, an output stage block 650 (open collector output stage 650A in FIGS. 6A and 6B; totem-pole output stage 650B in FIGS. 6C and 6D), a startup loop block 660 and a 15 V regulator block 680. FIGS. 6B and 6D additionally include a peak detector block 670.

Figure 6A:
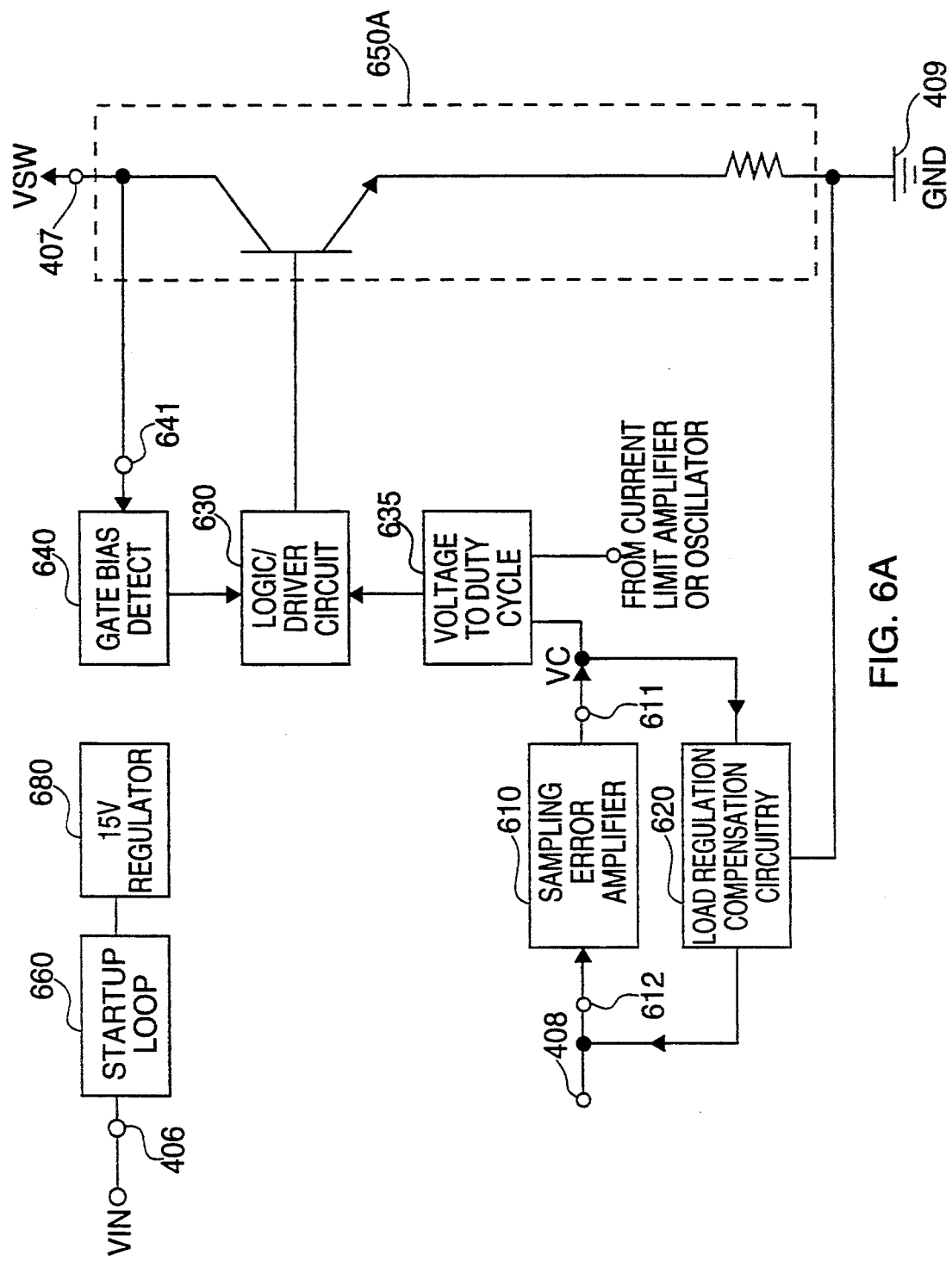
FIGS. 6A–6D show simplified block diagrams of alternative embodiments of switching regulator control circuit 405 of FIGS. 4A and 4B in accordance with the principles of the present invention.
Figure 6B:
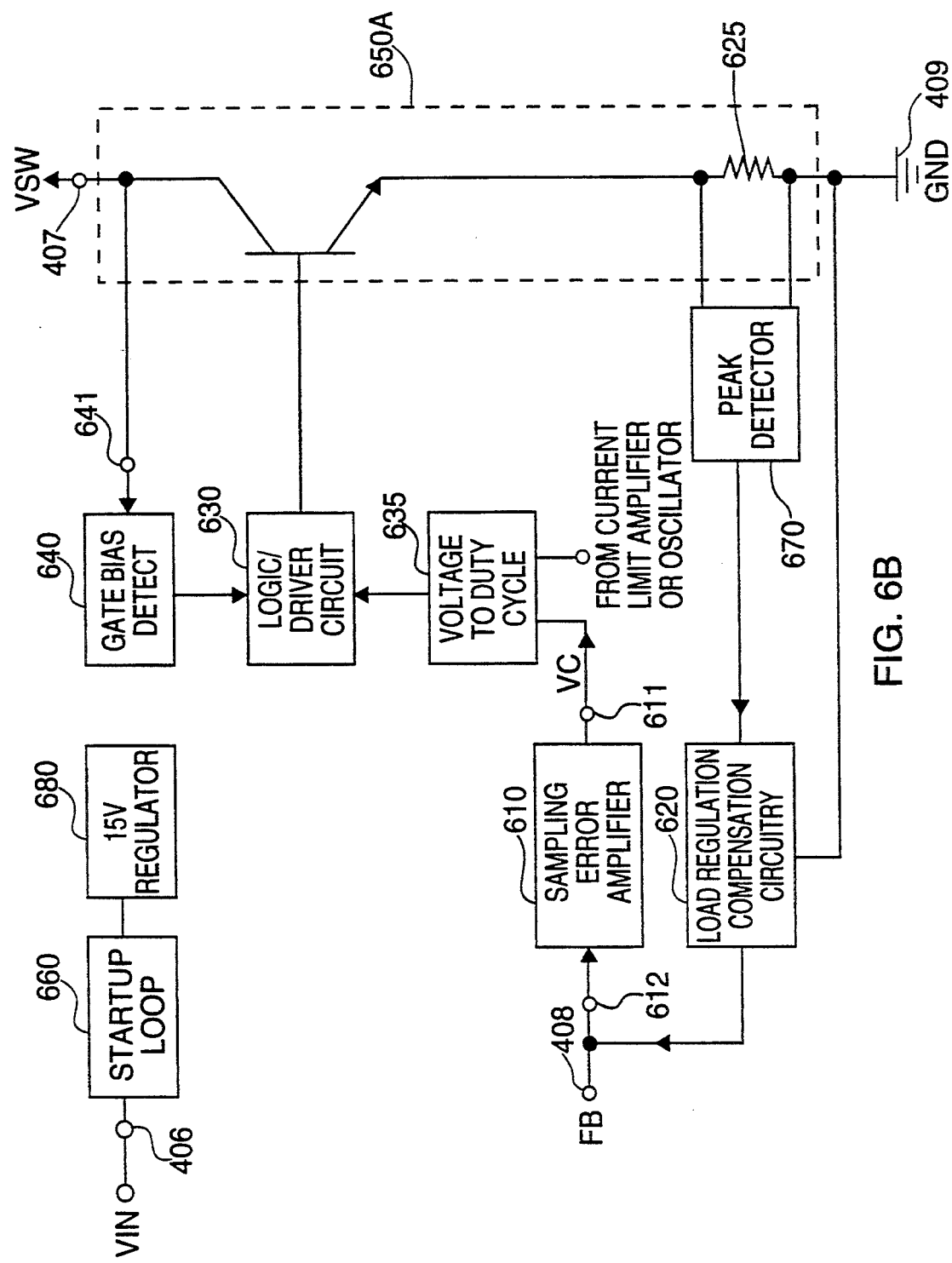

Referring now to FIG. 6A, sampling error amplifier 610 has an input 612 connected to feedback terminal 408 for receiving a magnetic flux-sensing feedback signal. Sampling error amplifier 610 samples the feedback signal at a predetermined point during "switch off" time and generates a control signal at VC terminal 611 responsive to which logic/driver circuit 630 controls the on and off cycle of output stage 650. More particularly, the VC voltage is compared to a signal voltage indicative of switch current (current mode) or a voltage from a tri-wave oscillator (voltage mode) at the input to voltage to duty cycle converter block 635, which then provides a signal to logic/driver circuit 630 to turn off the switch when the signal voltage exceeds the VC voltage. Load regulation compensation circuit 620, in conjunction with a resistor connected in series between feedback terminal 408 and the source of the feedback signal (e.g. feedback circuit 414), adjusts the input to sampling error amplifier 610 to compensate for errors in the feedback signal created by parasitic voltage drops in the output circuitry of the switching regulator circuit. Gate bias detect circuit block 640 monitors the voltage at VSW terminal 407 of switching regulator control circuit 405 and prevents logic/driver circuit block 630 from turning on output stage 650 when the voltage at VSW terminal 407 is excessively low or excessively high, so as to protect the regulator switch transistor from undesirable bias conditions. Finally, startup loop 660 includes circuitry for starting up biasing circuits in control circuit 405 when an input voltage is applied and for powering internal 15 V regulator 680.

In comparing FIG. 6A to FIG. 6B it is seen that load regulation compensation circuit 620 can be incorporated into switching regulator control circuit 405 in various ways, as will become more apparent below. In contrast to the embodiment of FIG. 6A, in which load regulation compensation circuit 620 monitors VC terminal 611, load regulation compensation circuit 620 in the embodiment of FIG. 6B monitors a voltage (provided by peak detector circuit 670) which is representative of the peak switch current through resistor 625 in output stage block 650 in order to compensate for a changing load current.

Figure 6C:
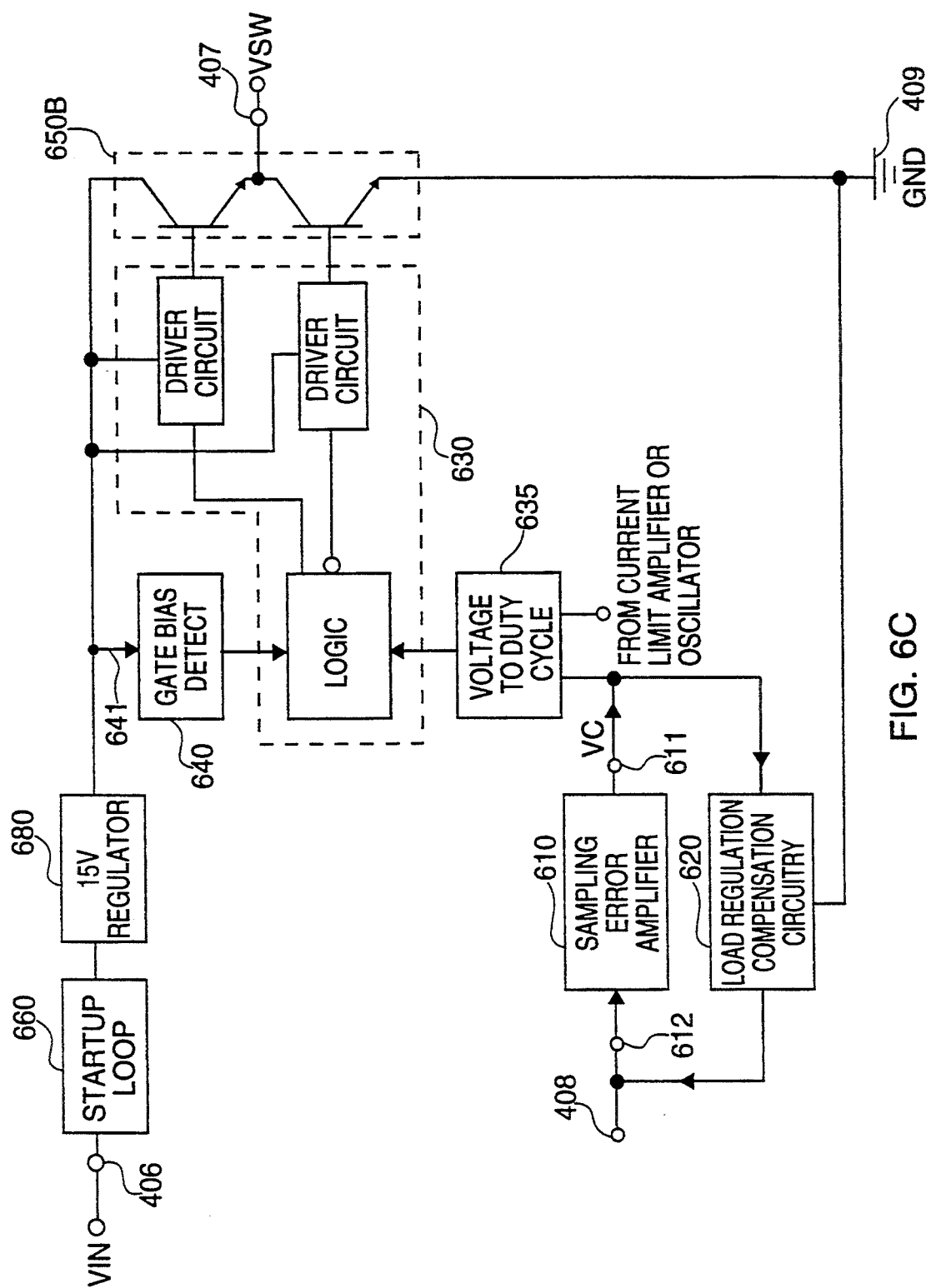
Figure 6D:
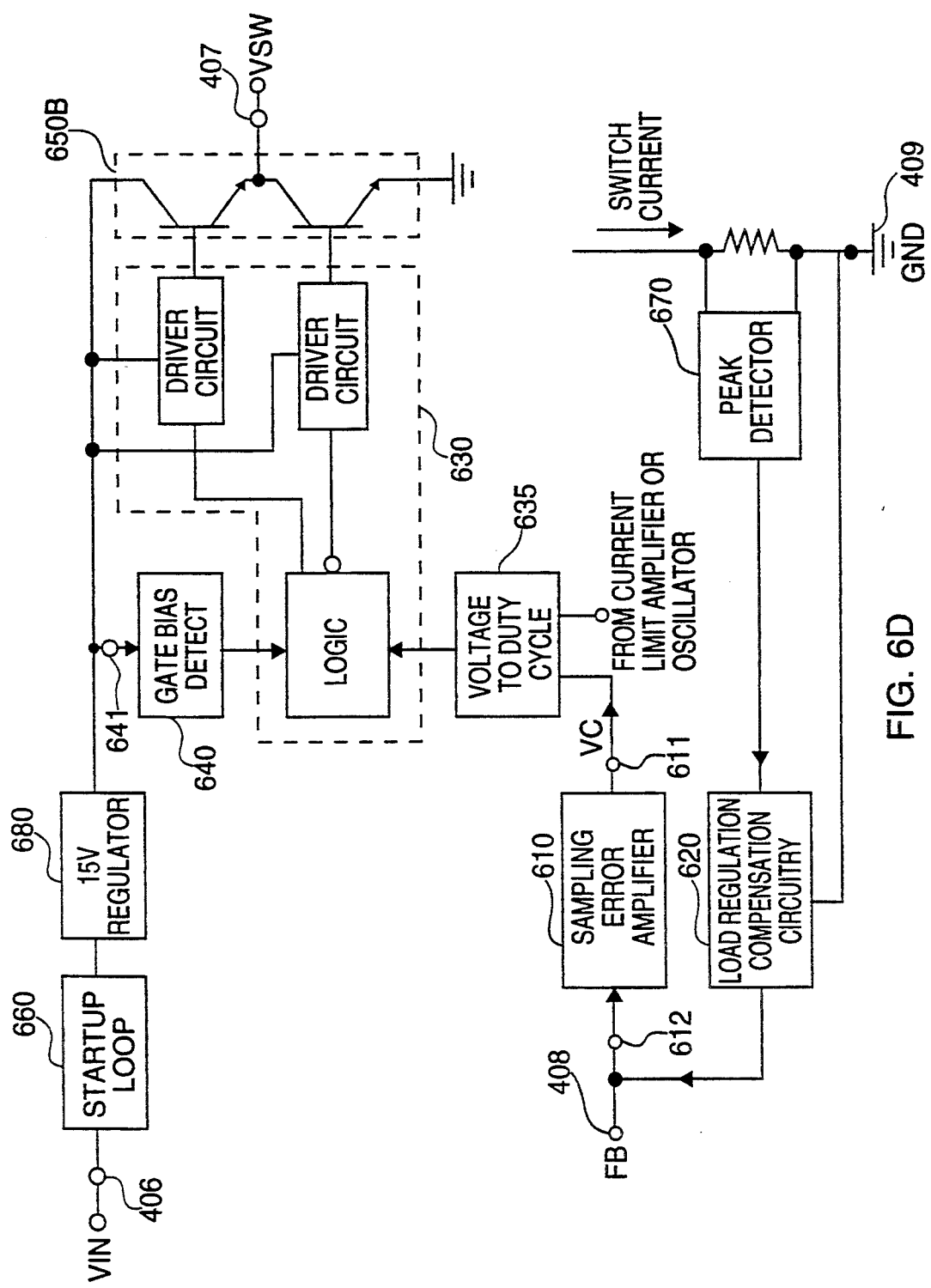

In comparing FIGS. 6A and 6B to FIGS. 6C and 6D, it is also seen that gate bias detect circuit 640 can be incorporated into switching regulator control circuit 405 in various ways, as will also become more apparent below. In the embodiments of FIGS. 6A and 6B, gate bias detect circuit 640 monitors the voltage on VSW terminal 407. In contrast, in the embodiments of FIGS. 6C and 6D, gate bias detect circuit 640 monitors the voltage on terminal 641 which is connected to both driver stages of logic/driver circuit 630 and which is a regulated voltage (i.e. regulated by regulator block 680). FIGS. 6C and 6D show this gate bias detect configuration in circuits including the load compensation schemes of FIGS. 6A and 6B, respectively.

Figure 7:
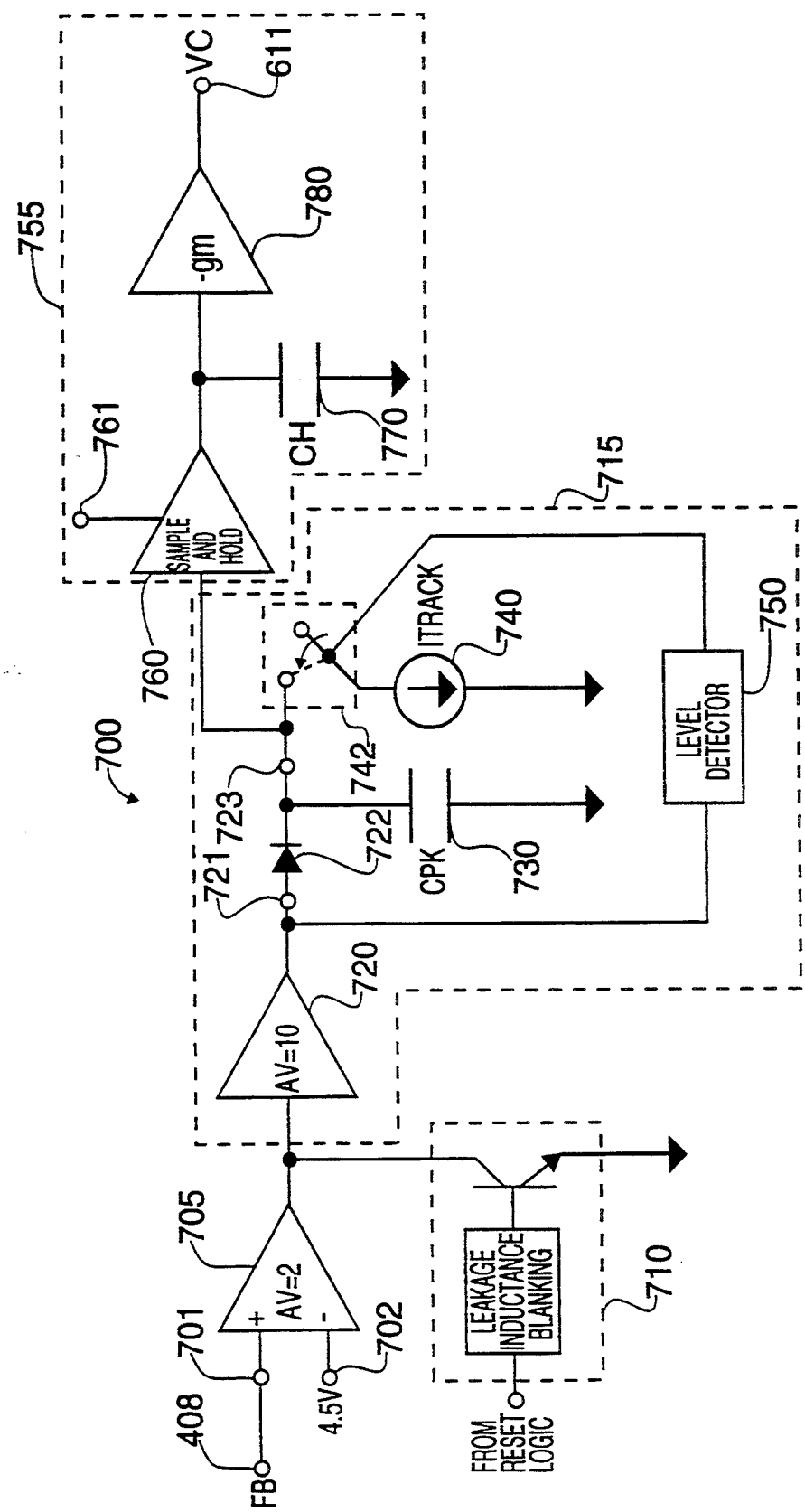
FIG. 7 is a block diagram of an embodiment of sampling error amplifier circuit 610 of FIGS. 6A–6D.

A more detailed block diagram of an embodiment 700 of sampling error amplifier circuit block 610 of FIGS. 6A-6D is shown in FIG. 7. The embodiment 700 of FIG. 7 comprises differential amplifier circuit 705, leakage inductance spike blanking circuit 710, slew rate limited tracking circuit 715, and sample and hold circuit 755. Differential amplifier circuit 705 compares the feedback signal applied to its non-inverting input 701 with a reference voltage applied to its inverting input 702, and generates an error signal which is provided to the input of amplifier 720 of slew rate limited tracking circuit 715.

The leakage inductance spike blanking circuit 710 of sampling error amplifier circuit 700 eliminates the effects of the primary leakage inductance spike (peak 211 in FIGS. 2A and 2B) from the error signal. Leakage inductance spike blanking circuit 710 suppresses the error signal at the input of amplifier 720 for a fixed period of time at the start of "switch off" time until the leakage inductance spike has died away. This prevents any primary leakage inductance spike effects from being propagated through the error amplifier so as to affect the regulated output voltage.

Once the effects of the leakage inductance spike have been eliminated, the effects of decreasing bias winding voltage (see regions 212 in FIGS. 2A and 2B) can be accounted for. This accounting is provided by slew rate limited tracking circuit 715. Tracking circuit 715 comprises tracking amplifier 720, diode 721 (which may also be a transistor), ITRACK switch 742, level detector 750, CPK voltage storage capacitor 730 and ITRACK current source 740. With the conventional diode/capacitor peak detector circuitry of FIG. 3 replaced by the voltage follower feedback circuit of FIG. 5, a feedback signal waveform following the positive voltage values of the bias winding voltage is applied to the input of tracking amplifier 720 (after conditioning by differential amplifier 705 and leakage inductance spike blanking circuit 710). Tracking amplifier 720 generates an amplified signal at its output 721 that follows the voltage waveform at its input as it changes with time. This amplified signal is placed onto CPK voltage storage capacitor 730 through a peak detector network formed by the combination of diode 722 in conjunction with CPK voltage storage capacitor 730.

Tracking is accomplished by the use of ITRACK current source 740 which allows CPK voltage storage capacitor 730 to discharge at a controlled rate so that the voltage at terminal 723 follows the voltage waveform. The value of the current conducted by ITRACK current source 740 is carefully chosen to limit the tracking slew rate on CPK voltage storage capacitor 730 to equal the rate at which the voltage waveform is expected to decrease. This limited tracking rate allows the switching regulator to track and sample in either discontinuous or continuous mode. Tracking is maintained until the point in time when the bias winding voltage collapses as a result of all transformer energy being depleted (discontinuous mode) or when the switch turns on again (continuous mode). Level detector circuit 750 senses when the bias winding voltage is collapsing and activates the internal peak detector by shutting off ITRACK current source 740 through the use of ITRACK switch 742. This saves the instantaneous error voltage stored on CPK voltage storage capacitor 730 when the bias winding voltage collapses. Thus, the most accurate representation of the output voltage is acquired and provided to the input of the last stage of sampling error amplifier circuit 700. Although not shown in FIG. 7, the simplified diagram of circuit 700 preferably includes buffering circuitry for coupling the stored capacitor voltage to the last stage.

The last stage of sampling error amplifier circuit 700 comprises sample and hold circuit 755 which works as follows. A sample and hold amplifier 760 has a sample and hold (S/H) control terminal 761 which is controlled by a logic switch not shown in FIG. 7. This logic switch is part of logic/driver circuit block 630. The sample and hold amplifier 760 receives this logic signal when the logic/driver circuit turns the output switch back on (i.e. at point 204 in FIGS. 2A and 2B). When S/H control terminal 761 is turned on by the logic switch, sample and hold circuit 760 samples the buffered error voltage from CPK voltage storage capacitor 730 for a short period of time, preferably 1 microsecond, and then holds for the remainder of the switch cycle. This voltage is held on CH capacitor 770 and is then processed by inverting gm stage 780 and converted into a control signal VC at sampling error amplifier circuit output 611.

Another feature of the present invention is provided by a unique load regulation compensation circuit. As stated above, output regulation degrades with increasing load current (output power). This effect is traced to secondary leakage inductance and parasitic secondary winding, diode and output capacitor resistances. Even though the sampling error amplifier circuit has obtained the most accurate representation of the output voltage, its output is still flawed by the amount of the voltage drop across the parasitic lumped sum equivalent impedance which is coupled to the bias winding voltage. This error increases with increasing load current. To compensate for the parasitic voltage drop a load regulation compensation circuit has been provided.

Figure 8:
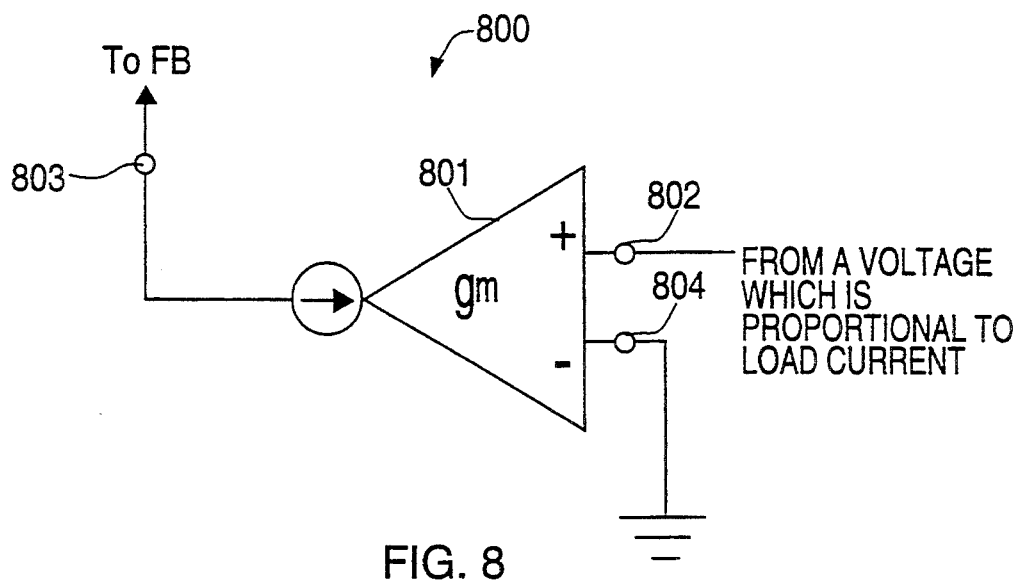
FIG. 8 is a block diagram of an embodiment of load regulation compensation circuit 620 of FIGS. 6A–6D.

A block diagram of an embodiment of load regulation compensation circuit 620 of FIGS. 6A-6D is shown in FIG. 8. Load regulation compensation circuit 800 of FIG. 8 works as follows. Generally, the current through the switching element (see 104 in FIG. 1) is proportional to the load current as defined by the turns ratio of the transformer. Accordingly, a small current proportional to the switching current is generated by current amplifier 801 and fed to terminal 803 of load regulator compensation circuit 620 which is connected to feedback terminal 408. This allows the input bias current of the error amplifier to be a function of load current. Current amplifier 801 has an input terminal 802 to which a signal proportional to load current must be applied. This signal may be the voltage at terminal VC, as shown in FIGS. 6A and 6C, or a voltage which represents the average value of the switch current, with the switch current being sensed across a sense resistor, as shown in FIGS. 6B and 6D. A resistor in series between feedback circuit 414 and feedback terminal 408 (see resistor 505 of FIG. 5) is provided to generate a voltage drop that attenuates the feedback signal in proportion to load current. The voltage drop can be viewed as creating a linear increase in the effective reference voltage with increasing load current. This translates to a linear increase in output voltage with increasing load current. By adjusting the value of the series resistor 505, the slope of the load compensation is adjusted and can be set to cancel the load current dependent effects of parasitic voltage drops in the switching regulator circuit. Appropriate values for the series resistor, which will typically be in the range of 1 k-100 kohms, can be chosen empirically.

The present invention also includes a unique protection circuit for the external power transistor, preferably a MOSFET, which is used as switch 104. This circuit protects the FET from both insufficient and excessive gate drive voltage on a cycle by cycle basis, and is shown in FIGS. 6A-6D as gate bias detect circuit 640. As will be apparent, gate bias detect circuit 640 can also be incorporated into a variety of other electronic circuits besides switching voltage regulator circuits. Such circuits include any application which employs a power transistor where it would be desirable to be able to detect a particular range of voltages to which a bias terminal of the transistor is exposed. The operation of this circuit, in the context of the switching voltage regulator circuit of the present invention, will now be discussed.

Figure 10:
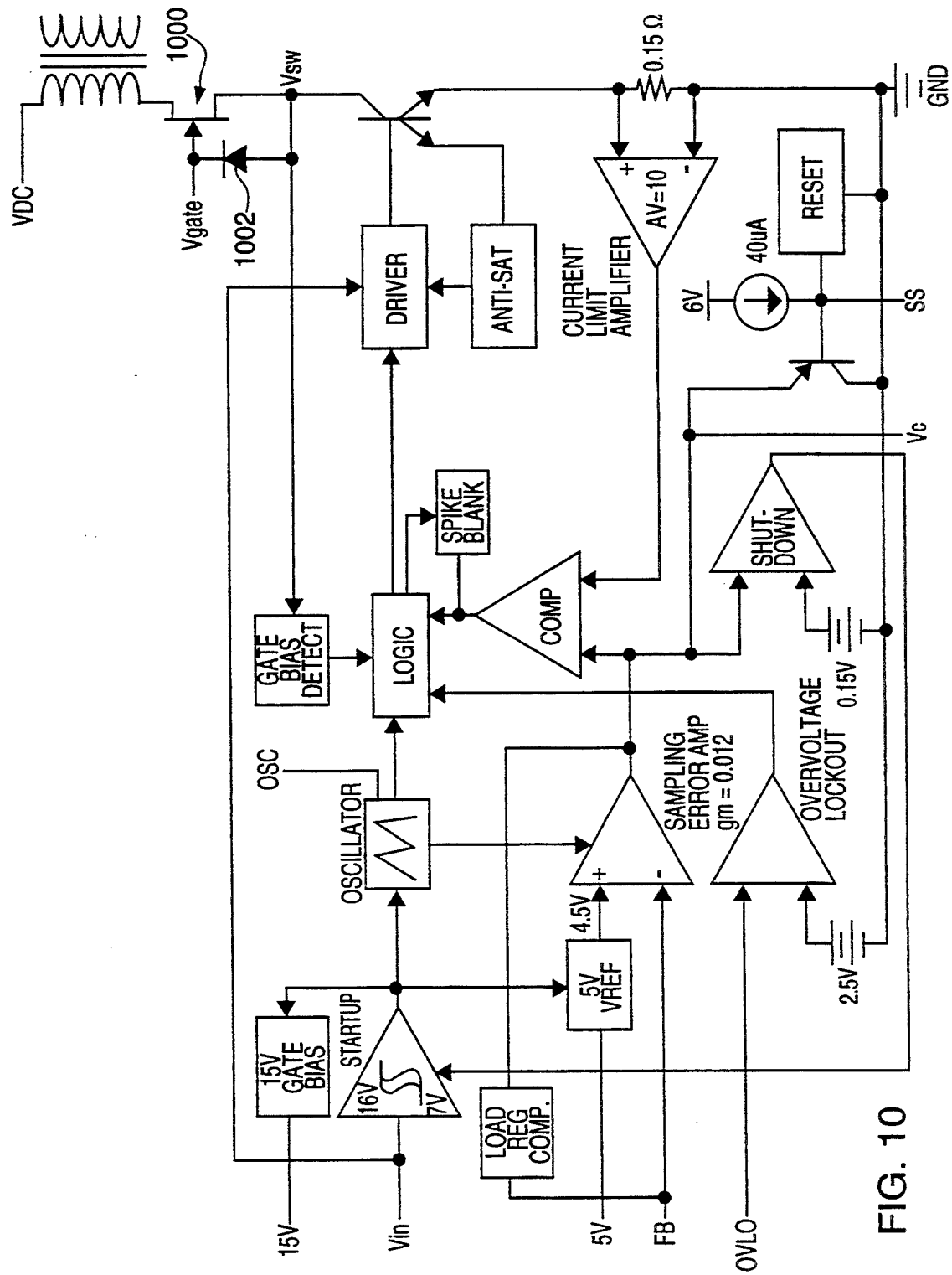
FIG. 10 is a block diagram of a first preferred embodiment of switching regulator control circuit 405 incorporating embodiments of the sampling error amplifier circuit, the load regulation compensation circuit and the gate bias detect circuit of the present invention.

The switching regulator control circuit 405 of the present invention, as shown in the embodiments of FIGS. 6A and 6B, preferably drives a power MOSFET switch connected in a common-gate or cascade configuration (e.g., as shown by the connection of FET 1000 in FIG. 10) at the open collector output provided at VSW terminal 407. The gate needs to be biased at a voltage high enough to guarantee that the MOSFET switch is on when the open collector source drive is on. This means 10 V as specified in power MOSFET datasheets, plus 1 V for the typical saturation voltage of the switching regulator switch (405 in FIG. 4A), plus a few volts for temperature variations and processing tolerances. This leads to approximately 15 V for a practical gate bias voltage. Accordingly, the switching regulator control circuit of the present invention preferably includes a 15 V regulated output for biasing the gate of the MOSFET and is shown as block 680 in FIGS. 6A-6D. However, the gate of the FET may also be biased from VIN or some other gate voltage source. The voltage biasing the gate of the FET is shown in FIG. 10 as $V_{gate}$.

Figure 9:
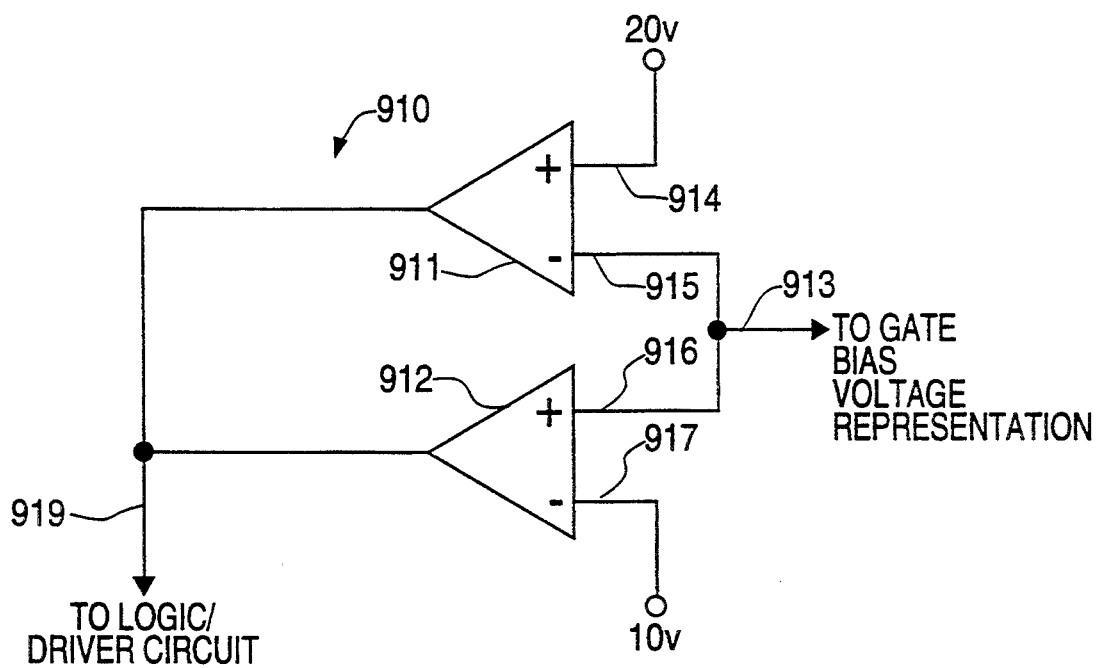
FIG. 9 is a block diagram of an embodiment of gate bias detect circuit 640 of FIGS. 6A–6D.

A detailed block diagram of an embodiment of gate bias detect circuit 640 of FIGS. 6A-6D is shown in FIG. 9. Gate bias detect circuit 910 senses the voltage at the gate bias terminal 913 prior to turning on the switch. The VSW terminal 407 of switching regulator control circuit 405 (FIGS. 6A-6B) is tied to the source of the FET and should represent the bias voltage on the gate when the switch is off. When the switch turns off, the drain of the FET flies back until it is clamped by a snubber network. The source also flies high due to parasitic capacitive coupling on the FET and parasitic inductance of the leads. An extra external diode (e.g., diode 1002 in FIG. 10) from the source to the gate provides insurance against fault conditions that might otherwise damage the FET. The diode clamps the source to one diode drop above the gate, thereby limiting the gate-source reverse bias.

Once the energy in the leakage inductance of the primary is dissipated, the diode shuts off. The source is then floating and its voltage will be close to $V_{gate}$. If the sensed voltage on VSW is less than the 10 volts on negative input terminal 917 then comparator 912 prevents the switch from turning on. Furthermore, if the sensed voltage is greater than the 20 volts on positive input terminal 914, then comparator 911 also prevents the switch from turning on. This protects the FET from dissipating high power in a non-saturated state or from excessive gate-source voltage. The oscillator of the switching regulator control circuit continues to run and the net effect is to skip switching cycles until the gate bias voltage is corrected.

The switching regulator control circuit of the present invention, as shown in the embodiments of FIGS. 6C and 6D, preferably drives a power MOSFET switch connected in a common source configuration (e.g., as shown by the connection of FET 1200 in FIG. 12) at the totem-pole output provided at VSW terminal 407. The gate needs to be biased at a voltage high enough to guarantee that the MOSFET switch is on when the totem-pole output stage drives the gate of the FET. This means 10 V as specified in power MOSFET datasheets, plus 2 V for the typical saturation voltage of the upper totem-pole transistor, plus a few volts for temperature variations and processing tolerances. This leads to approximately 15 V for a practical gate bias voltage. Accordingly, the switching regulator control circuit of the present invention preferably includes a 15 V regulated output for biasing the totem-pole output stage (e.g., 15 V regulator block 680).

When used in the circuits of FIGS. 6C and 6D, gate bias detect circuit 910 senses the 15 V regulator output voltage prior to the totem-pole output stage pulling the gate of the FET high and turning on the switch. If the sensed 15 V regulator output voltage is less than the 10 V on input terminal 917, then comparator 912 prevents the switch from turning on. Furthermore, if the sensed voltage is greater than the 20 volts on positive input terminal 914, then comparator 911 also prevents the switch from turning on. This protects the FET from dissipating high power in a non-saturated state or from excessive gate-source voltage. The oscillator of the switching regulator control circuit continues to run and the net effect is to skip switching cycles until the gate bias voltage is corrected.

It should be apparent that although the embodiment 910 of the gate bias detect circuit of FIG. 9 has a voltage "window" from 10 to 20 volts, the size and center voltage of this window can easily be altered by connecting other voltages to comparator terminals 914 and 917 in FIG. 9.

FIG. 10 illustrates a first preferred switching voltage regulator control circuit incorporating embodiments of the sampling error amplifier circuit, the load regulation compensation circuit and the gate bias detect circuit of the present invention. FIG. 10 shows, in block diagram form, how these embodiments are functionally interrelated with other functional circuit blocks in the switching regulator control circuit. There are various ways to implement the first preferred embodiment of FIG. 10 in accordance with the principles of the present invention. Exemplary circuitry is shown by the detailed schematic diagrams of FIGS. 11A-11M.

Figure 11A:
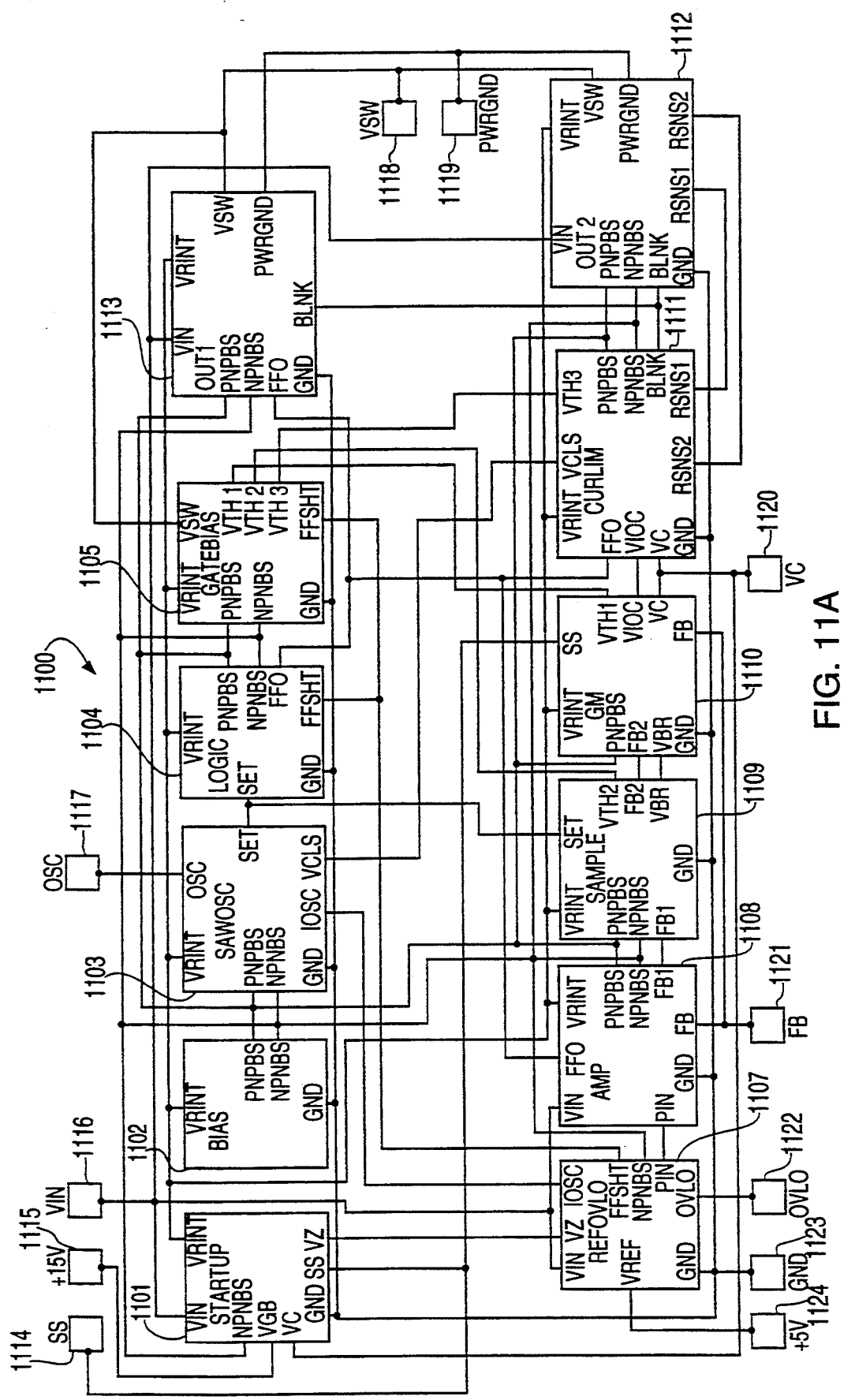
FIG. 11A is a top level diagram of a preferred integrated circuit implementation of the embodiment of the switching voltage regulator control circuit 405 shown in FIG. 10.

FIG. 11A shows a top level block diagram 1100 of an integrated circuit implementation of the switching voltage regulator control circuit shown in FIG. 10. The integrated circuit includes twelve functional blocks and eleven external terminals. The external terminals are: soft-start terminal 1114, (+) 15 volt terminal 1115, input voltage terminal 1116, oscillator terminal 1117, voltage switching terminal 1118, power ground terminal 1119, control voltage terminal 1120, feedback terminal 1121, overvoltage lockout terminal 1122, ground terminal 1123 (connected internally to power ground terminal 1119), and (+) 5 volt terminal 1124.

The twelve functional blocks of top level block diagram 1100 are: startup block 1101, bias line generator block 1102, sawtooth oscillator block 1103, logic block 1104, gate bias detect block 1105, reference voltage/overvoltage lockout block 1107, feedback amplifier block 1108, sampling amplifier buffer block 1109, output gm stage block 1110, current sense amplifier block 1111, output stage one block 1113 and output stage two block 1112. Preferred circuit embodiments for implementing each of these functional blocks are shown in FIGS. 11B–M. The functions performed by the sampling error amplifier (e.g. FIG. 7) circuit and the load regulation compensation circuit (e.g. FIG. 8) of the present invention are incorporated, in the embodiment of FIG. 11, into three functional blocks: feedback amplifier block 1108, sampling error buffer block 1109 and output gm stage block 1110. These blocks are respectively shown in FIGS. 11B, 11C and 11D.

Figure 11B:
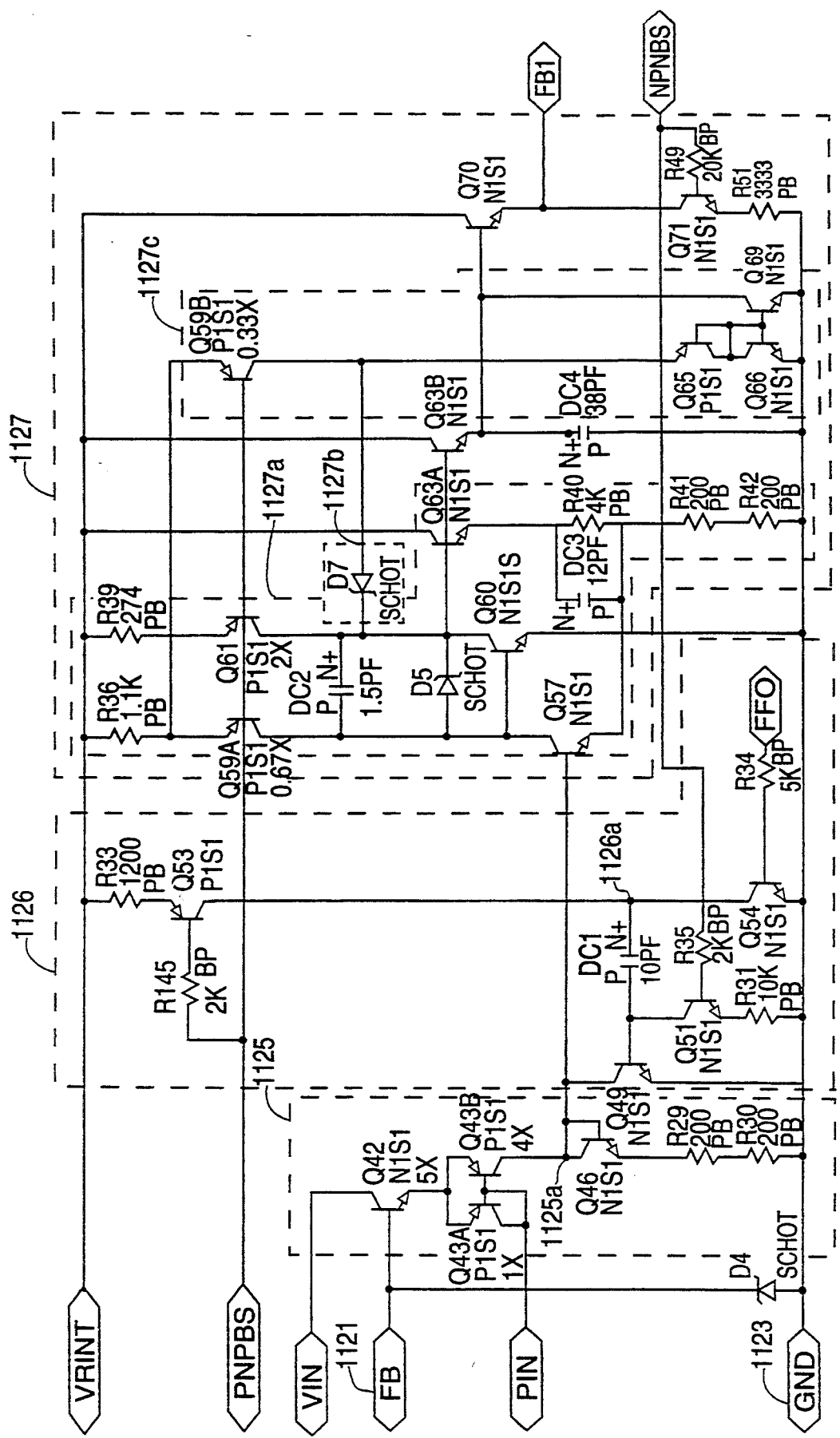
FIG. 11B is a schematic diagram of feedback amplifier block 1108 of FIG. 11A.

In FIG. 11B, terminal FB connects feedback amplifier block 1108 to external feedback terminal 1121 and terminal PIN connects block 1108 to a reference voltage, equal to 4.5 volts minus two $V_{BE}$, that is generated by the reference voltage/overvoltage lockout block 1107. Diode D4 is a Schottky clamp for preventing any negative going transient spikes due to parasitic capacitive coupling effects. Terminals FB and PIN provide a feedback voltage and the reference voltage (4.5-2 $V_{BE}$), respectively, as differential input signals to amplifier 1125 which has a voltage gain of two. The output of amplifier 1125 is taken from node 1125a between transistors Q43B and Q46. Amplifier 1125 corresponds to amplifier 705 in FIG. 7. The output of amplifier 1125 is connected to leakage inductance blanking circuit 1126. PNP transistor Q53 is a constant current source which feeds current to node 1126a connecting capacitor DC1 and transistor Q54. Transistor Q54 is switched between an on and off states by logic signal FFQ which is generated in logic block 1104 of FIG. 11A. It is this signal which triggers the leakage inductance blanking. The length of time that the leakage inductance blanking circuit remains on is set by capacitor DC1, which in the present embodiment gives rise to a 1.5 micro-second pulse width.

The output of leakage inductance blanking circuit 1126 is connected to tracking circuit 1127, which includes components corresponding to all of the components present in the slew rate limited tracking circuit 715 of FIG. 7: a gain of ten tracking amplifier 1127a, a level detect circuit 1127b, a voltage storage capacitor DC4 and an ITRACK current source 1127c. Tracking circuit 1127 includes resistors R40, R41 and R42 to set the gain of tracking amplifier 1127a which has its output at the collector of transistor Q60. Transistor Q63B, which is configured as an emitter follower, serves the purpose of diode 722 in the embodiment of FIG. 7. In conjunction with voltage storage capacitor DC4, transistor Q63B forms a peak detector network such that the peak voltage at the output of amplifier 1126, minus the voltage drop across diode 722, is stored on capacitor DC4. Transistor Q59B is a current source which feeds a current mirror circuit comprising transistors Q65, Q66 and Q69. These transistors form a current source 1127c corresponding to ITRACK current source 740 in FIG. 7. Diode D7 serves as a level detector 1127b which diverts the current from current source Q59B so that it passes through diode D7 and transistor Q60 to ground when the flyback voltage collapses. This diversion of current then allows voltage storage capacitor DC4 to hold the last value of the tracking voltage just prior to the voltage collapse on the primary and bias windings. The voltage stored on voltage storage capacitor DC4 is then buffered, in the present embodiment, through an emitter-follower stage comprising transistor Q70. The voltage at the emitter of transistor Q70, labelled as FB1 in FIG. 11B, is the voltage which is fed to the sample and hold circuit (e.g., 755 of FIG. 7) of the present invention. In the presently-discussed embodiment, the sample and hold circuit is depicted in FIGS. 11C and 11D.

Figure 11C:
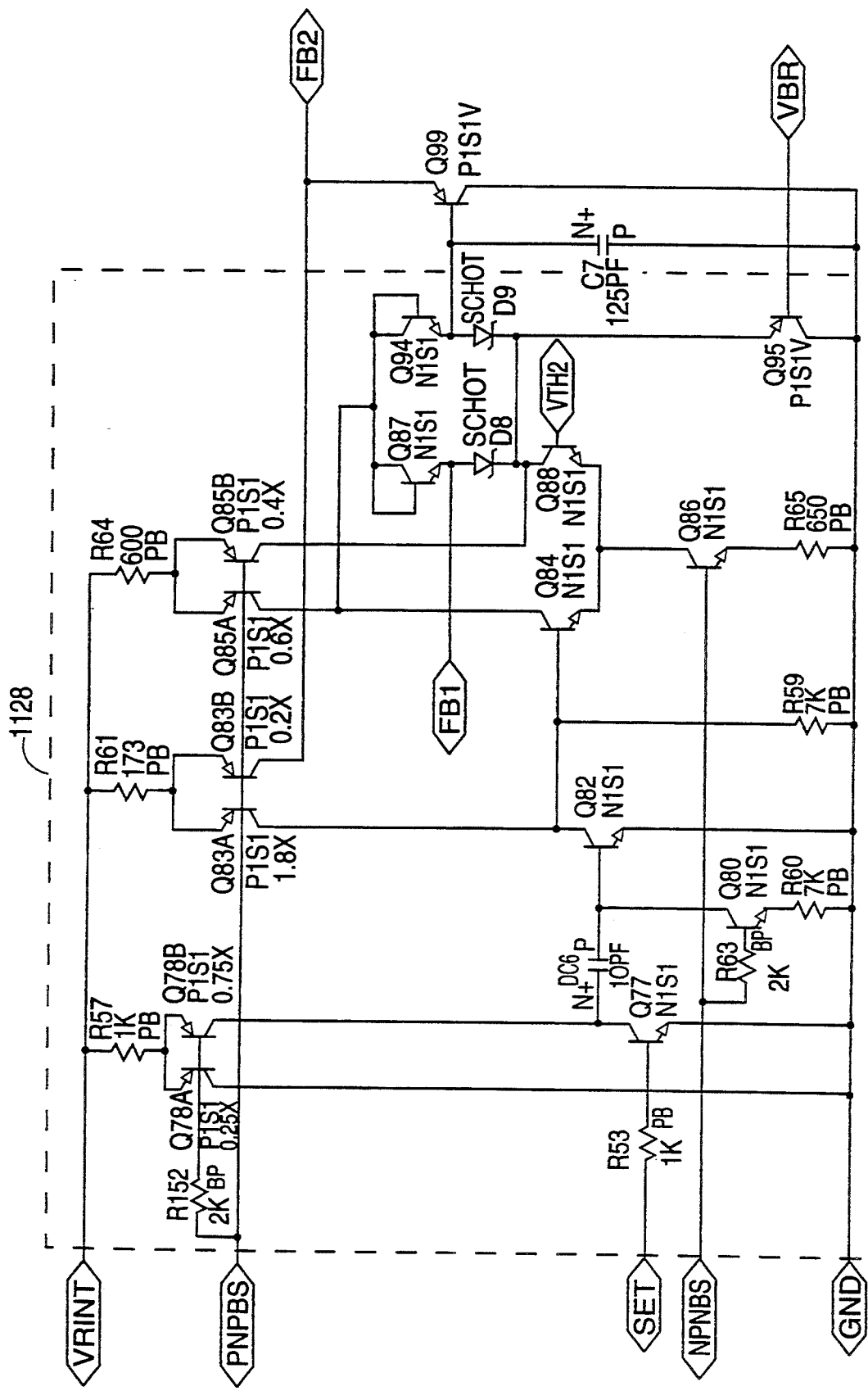
FIG. 11C is a schematic diagram of sampling error buffer block 1109 of FIG. 11A.

FIG. 11C is a schematic of sampling error buffer block 1109 of FIG. 11A, which includes sample and hold amplifier circuit 1128 corresponding to sample and hold amplifier 760 of FIG. 7. Terminal SET receives a logic signal from logic block 1103 of FIG. 11A. This signal tells sample and hold amplifier circuit 1128 to sample the voltage on terminal FB1 from tracking circuit 1127 in FIG. 11B. The time period over which this sampling takes place is determined by a combination of the current through the collector of transistor Q78B and the capacitance value of capacitor DC6. For the present embodiment, the sample time is set at one microsecond. During this sample time the voltage at terminal FB1 is transferred to capacitor C7 which corresponds to CH capacitor 770 in FIG. 7. The voltage on capacitor C7 is then stepped up one diode drop, by way of transistor Q99, and transferred via terminal FB2 to an output gm stage block 1110, as shown in FIG. 11A.

Figure 11D:
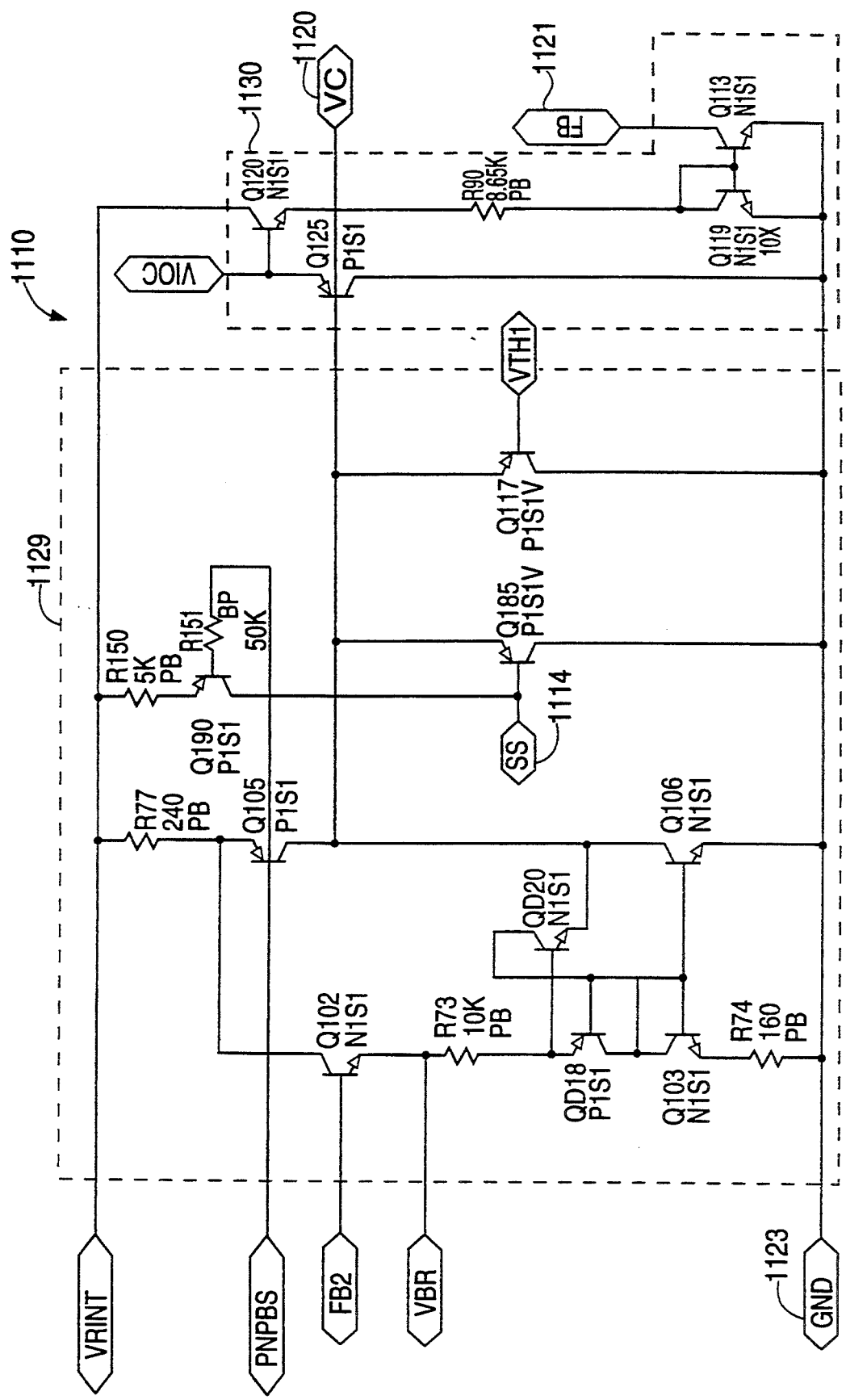
FIG. 11D is a schematic diagram of output gm stage block 1110 of FIG. 11A.

A detailed schematic of output gm stage block 1110 is shown in FIG. 11D. Block 1110 performs two main functions. The voltage from terminal FB2 of the sample and hold circuit 1128 in FIG. 11C is sent through an inverting gm stage 1129 which changes the sign of the voltage so as to provide negative feedback in the switching voltage regulator of FIG. 11A. Output gm stage block 1110 also performs the load regulation compensation function of the present invention. In the embodiment of FIG. 11D, load regulation correction is provided by load regulation compensation circuit 1130. Load regulation compensation circuit 1130 continuously monitors control voltage VC at terminal 1120. Transistor Q120 and resistor R90 converts this voltage into a current signal which is fed into the current mirror comprised of transistors Q119 and Q113. The collector of transistor Q113 is connected to external feedback terminal 1121 such that the internal bias current of the feedback error amplifier is made a function of the output current. The collector current of transistor Q113, in combination with an external feedback resistor such as resistor 505 in FIG. 5, compensates for the parasitic impedances on secondary winding of the transformer, as discussed above. The output of inverting gm stage 1129 of FIG. 11D is taken from the VC terminal 1120. This output is then fed into a comparator in current sense amplifier block 1111 (FIG. 11A).

Figure 11E:
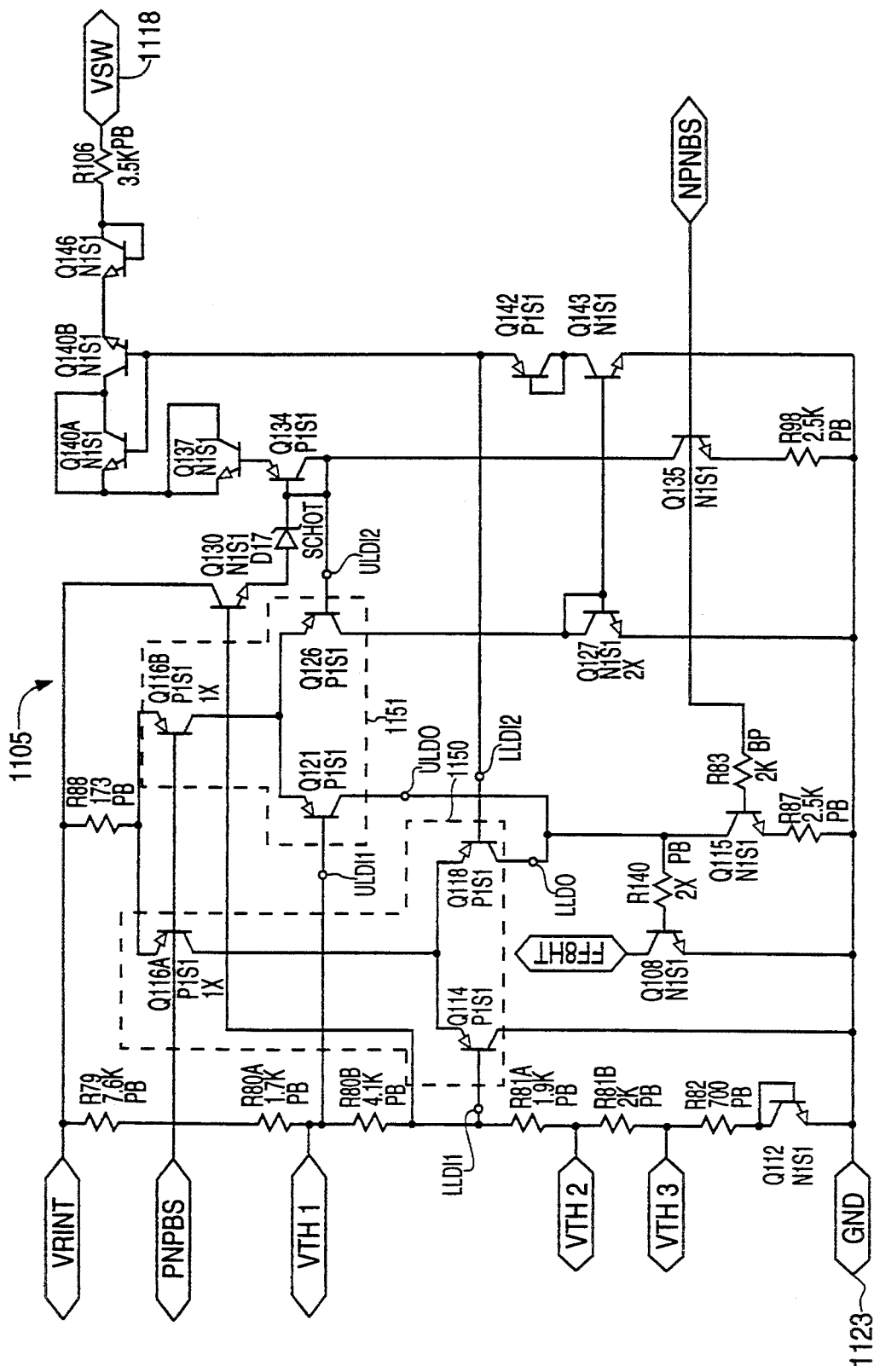
FIG. 11E is a schematic diagram of gate bias detect block 1105 of FIG. 11A.

In addition to the sampling error amplifier circuit and load regulation compensation circuits of the present invention, the embodiment of voltage regulator 1100 depicted in FIG. 11A also includes the gate bias detect circuit of the present invention. FIG. 11E shows a schematic diagram of gate bias detect block 1105 of FIG. 11A. Block 1105 corresponds to circuit 910 of FIG. 9. Block 1105 includes two emitter-coupled differential amplifiers: lower limit differential amplifier 1150 and upper limit differential amplifier 1151, which correspond respectively to amplifiers 911 and 912 of FIG. 9. Lower limit differential amplifier 1150 is a lower limit detector which is set to detect a switch transistor gate bias voltage falling below approximately 10 volts. Upper limit differential amplifier 1151 is an upper limit detector which is set to detect a switch transistor gate bias voltage which rises above approximately 20 volts.

Because gate bias detect circuit 1105 has both lower and upper voltage limits, the circuit is a "window" detector. Voltages which have a value outside of the "window" (i.e., lower than approximately 10 volts and higher than approximately 20 volts) are detected and, if detected, the driver circuit is prevented from turning on. The circuit work as follows.

Lower limit differential amplifier 1150 comprises a constant current source Q116A which feeds the emitter-coupled differential pair of PNP transistors Q114 and Q118. The output LLDO of the differential amplifier 1150 is taken from the collector of transistor Q118 and converted to a logic signal at terminal FFSHT. This logic signal is then sent to logic block 1104 (FIG. 11A) which controls the turning-on and turning-off of the driver circuit (output stage one 1113 and output stage two 1112 in FIG. 11A). The two inputs LLDI1 and LLDI2 to differential amplifier 1150 are at the bases of transistors Q114 and Q118, respectively. When the voltage at LLDI2 exceeds the voltage at LLDI1 the current from current source Q116A is normally sent through transistor Q114. However, when the voltage at LLDI2 drops below the voltage at LLDI1 the current is sent through transistor Q118 and the logic signal on terminal FFSHT prevents the driver circuit from turning on. In the present embodiment, with six volts on terminal VRINT, the voltage at LLDI1 is approximately 2.0 volts. (i.e., six volts dropped across resistors R79, R80A, R80B, R81A, R81B, R82 and the forward biased diode of transistor Q112, ignoring transistor base currents). The voltage on terminal VRINT is generated by a bias generator circuit 1137 in startup block 1101. As a result, when the voltage at terminal VSW drops below approximately 10 volts (e.g., 2 volts at LLDI2 plus a Zener drop of approximately 6.7 volts across transistor Q140B, plus a forward bias diode drop of approximately 0.7 volts across transistor Q146 (ignoring the voltage drop across resistor R106)) the logic signal on terminal FFSHT prevents the driver from turning on because the gate bias voltage is too low.

Upper limit differential amplifier 1151 prevents the driver from turning on when the gate bias voltage is too high. It comprises a constant current source Q116B which feeds an emitter-coupled differential pair of PNP transistors Q121 and Q126. The output ULDO of differential amplifier 1151 is taken from the collector of transistor Q121 and converted to a logic signal on terminal FFSHT. As was the case for lower limit differential amplifier 1150, the logic signal is then sent to logic block 1104 (FIG. 11A) which controls the turning-on and turning-off of the driver circuit (output stage one 1113 and output stage two 1112 in FIG. 11A). The two inputs ULDI1 and ULDI2 to differential amplifier 1151 are at the bases of transistors Q121 and Q126. When the voltage at ULDI2 is lower than the voltage at ULDI1 the current from current source Q116B is normally sent through transistor Q126. However, when the voltage at ULDI2 exceeds the voltage at ULDI1 the current is sent through transistor Q121 and the logic signal on terminal FFSHT prevents the driver from turning on. In the present embodiment, with six volts on terminal VRINT, the voltage at ULDI1 is approximately 3.25 volts. (i.e., six volts dropped across resistors R79, R80A, R80B, R81A, R81B, R82 and the forward biased diode of transistor Q112, ignoring transistor base currents). As a result, when the voltage at terminal VSW exceeds approximately 20 volts (e.g., 3.25 volts at ULDI2, plus two zener voltage drops of approximately 6.7 volts across transistors Q140B and Q137, plus three forward bias diode drops of approximately 0.7 each across transistors Q146, Q140A and Q134 (ignoring the voltage drop across resistor R106)) the logic signal on terminal FFSHT prevents the driver from turning on because the gate bias voltage is too high.

When gate bias detect circuit 1105 detects a voltage on terminal VSW which is outside of the "window" of appropriate voltages, a logic signal is sent by way of terminal FFSHT to logic block 1104 of FIG. 11A. As discussed above, one of the unique features of gate bias detect circuit 1105 of the present invention is that the voltages are continuously monitored throughout the switching cycle. As a result, the driver is prevented from turning on as soon as the voltage on terminal VSW falls outside of the "window."

The other circuit blocks of the embodiment of the switching regulator shown in FIG. 11A, which have not been discussed up to this point, are shown in FIGS. 11F-11M. They work as follows.

Figure 11F:
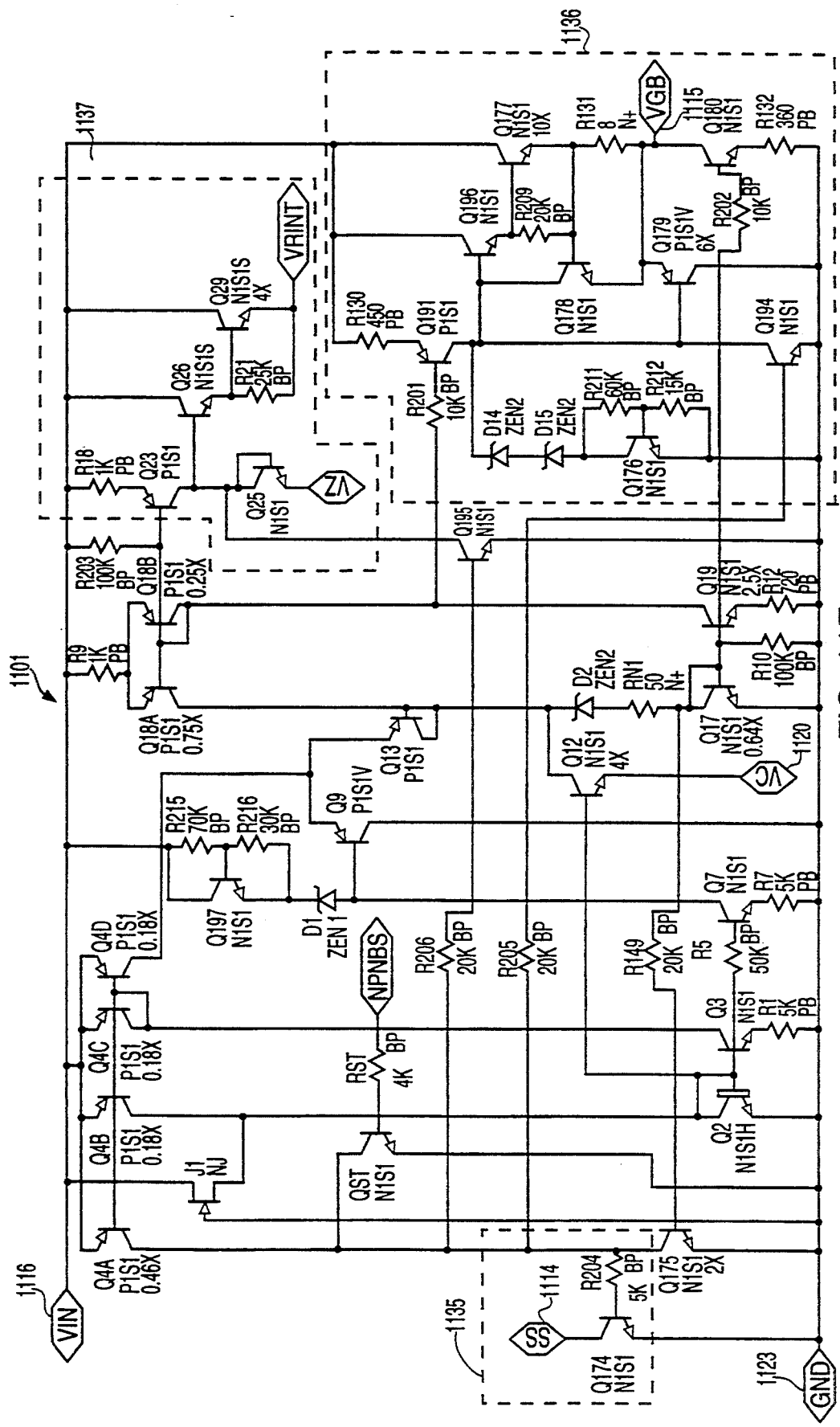
FIG. 11F is a schematic diagram of start-up block 1101 of FIG. 11A.

FIG. 11F shows start-up block 1101. It includes soft-start circuitry 1135, gate bias voltage generator circuitry 1136 and internal six volt bias generator circuitry 1137.

Figure 11G:
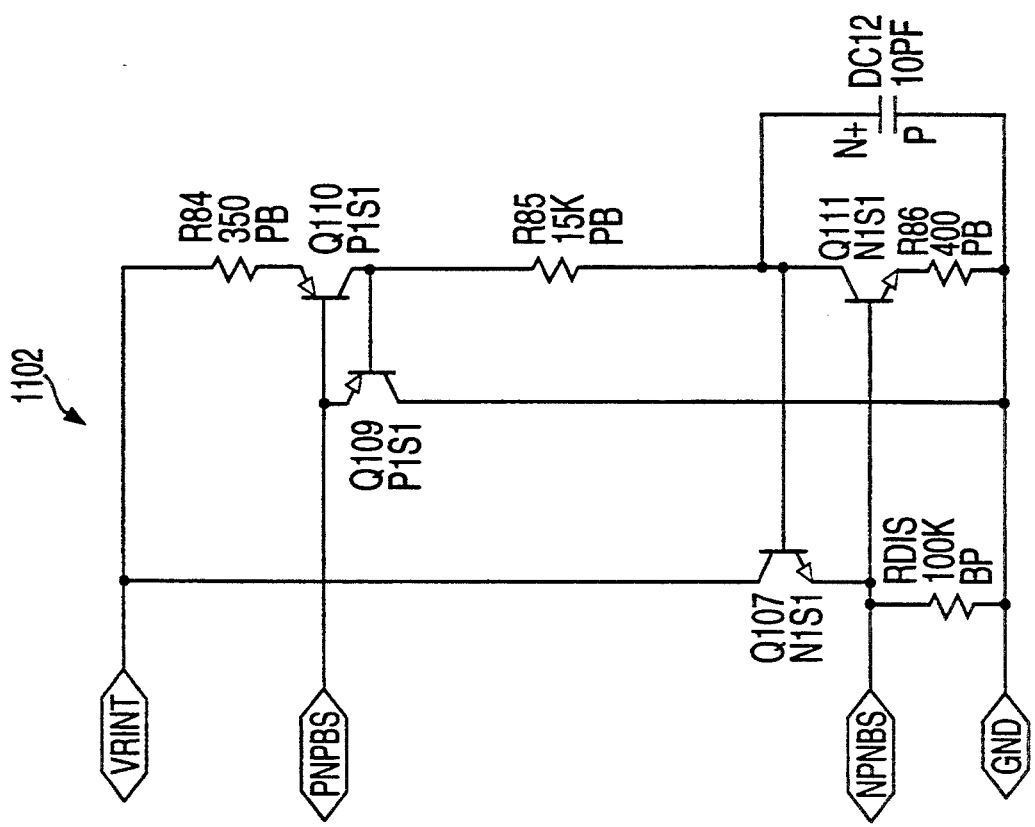
FIG. 11G is a schematic diagram of bias line generator block 1102 of FIG. 11A.

FIG. 11G shows bias line generator block 1102. It is powered by the six volt internal reference voltage on terminal VRINT which in generated in start-up block 1101 (FIG. 11F). Transistors Q109 and Q110 produce the PNP bias at terminal PNPBS, whereas transistors Q107 and Q111 produce the NPN bias at terminal NPNBS. As shown in FIG. 11A, these bias voltages are used throughout the embodiment of voltage generator 1100.

Figure 11H:
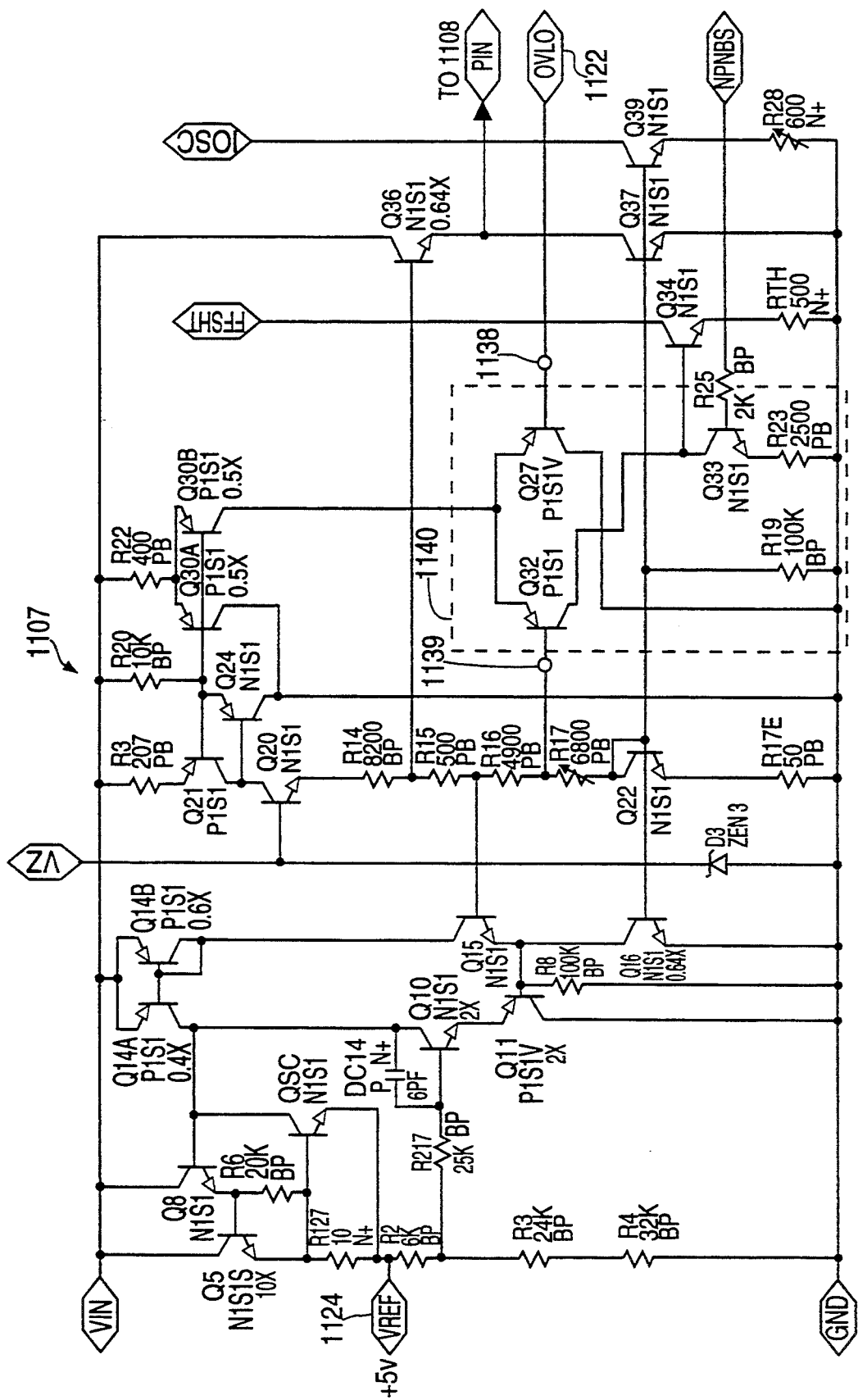
FIG. 11H is a schematic diagram of reference voltage/overvoltage lockout block 1107 of FIG. 11A.

FIG. 11H shows reference voltage/overvoltage lockout block 1107. This block produces a reference voltage of 4.5 volts minus two $V_{BE}$ and also turns off the output stage whenever the voltage at terminal OVLO is over 2.5 volts. With an external voltage of approximately 5 volts connected to VREF terminal 1124, the circuitry of block 1107 produces a reference voltage of 4.5 volts minus two $V_{BE}$ on terminal PIN. As discussed above in connection with amplifier 1125 of FIG. 11B, the feedback voltage on external feedback terminal 1121 is compared to this reference voltage to determine if the regulator output voltage VOUT (FIG. 1) is too high or too low. Accordingly, as shown in FIG. 11A, the voltage on terminal PIN is connected to feedback amplifier block 1108.

Overvoltage lockout (OVLO) terminal 1122 of block 1107 is used to sense the DC rectified line voltage at terminal 1116. This is preferably done by connecting a resistor divider between the DC rectified line voltage and ground. Accordingly, OVLO terminal 1122 would sense the voltage at the tap point of the resistor divider. This voltage, as shown in FIG. 11H, would then feed one input terminal 1138 of an emitter-couple differential amplifier 1140 comprising PNP transistors Q27 and Q32. The second input terminal 1139 is taken from a resistor string (R14, R15, R16 and R17E) which is connected to reference terminal PIN through one forward voltage drop (transistor Q36). Accordingly, when the voltage at differential amplifier input 1138 exceeds the voltage at differential amplifier input 1139, a logic signal is sent to terminal FFSHT (collector of transistor Q34). This signal prevents logic block 1104, on a cycle by cycle basis, from turning the driver circuit on until the voltage on OVLO terminal 1122 (connected to differential amplifier input 1138) safely falls below the voltage on differential amplifier input 1139.

Figure 11I:
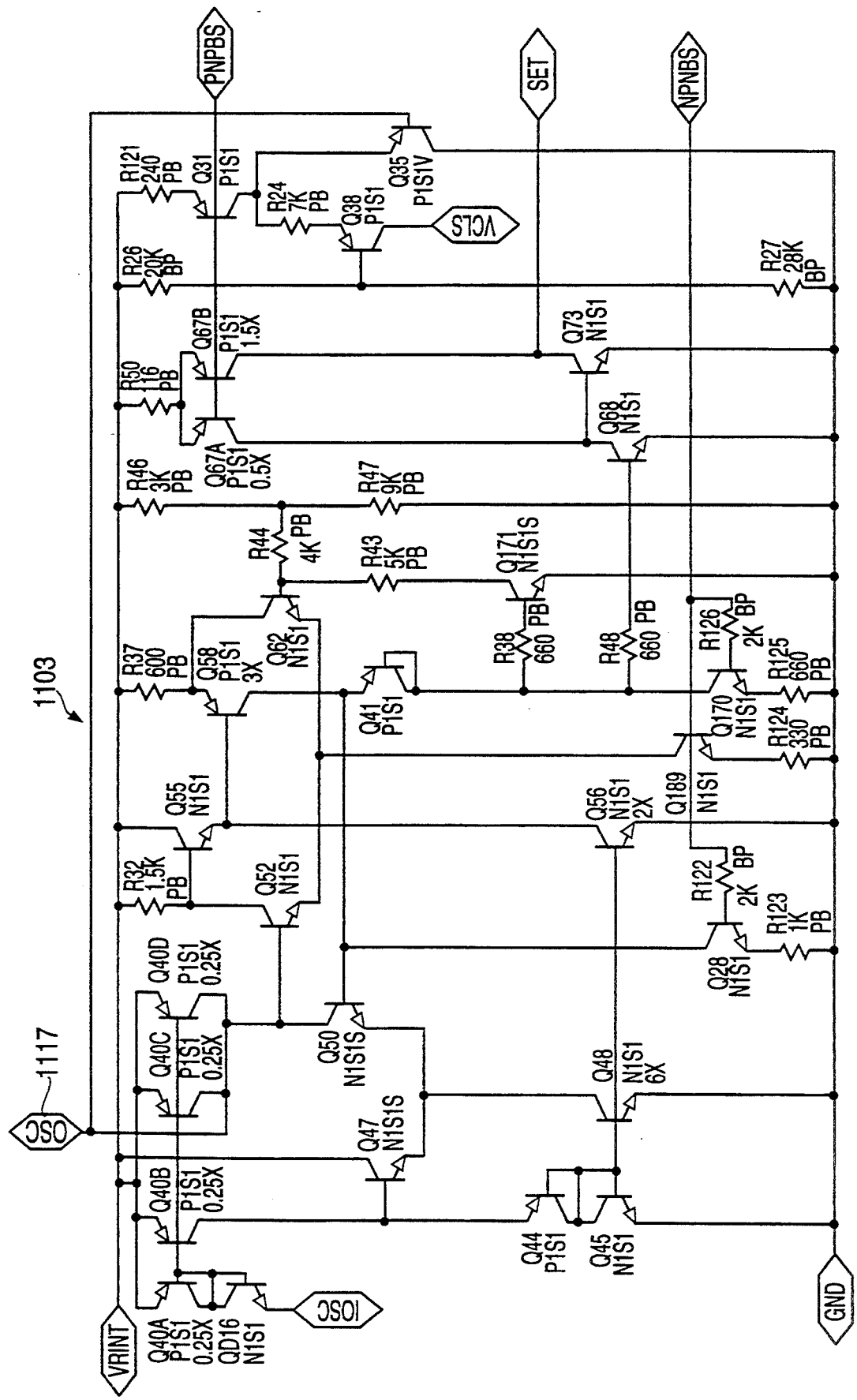
FIG. 11I is a schematic diagram of sawtooth oscillator block 1103 of FIG. 11A.

FIG. 11I shows sawtooth oscillator block 1103. An external capacitor connected to OSC terminal 1117 sets the frequency of operation for the switching regulator. The internal oscillator of block 1103 produces a flip flop set signal on terminal SET which is sent to both logic block 1104 and sampling amplifier buffer 1109, as shown in FIG. 11A.

Figure 11J:
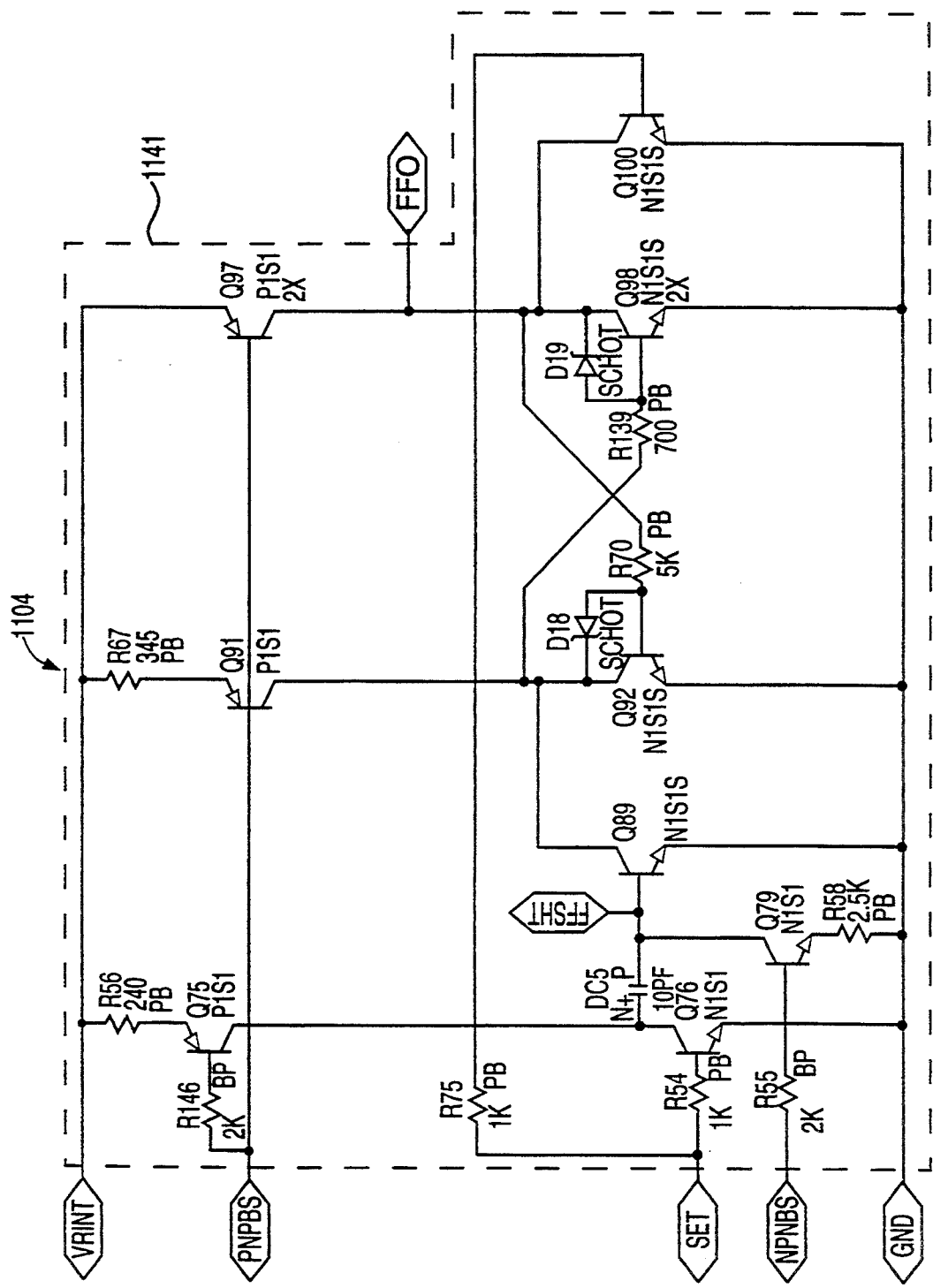
FIG. 11J is a schematic diagram of logic block 1104 of FIG. 11A.

Logic block 1104 is shown in FIG. 11J and comprises a single flip flop circuit 1141. The output (Q) of flip flop circuit 1141 is taken from terminal FFQ and is used to turn the driver circuit (output stage one block 1113 and output stage two block 1112) on and off. When FFQ is high, the driver is turned on. The flip-flop is reset by the output of the current limit comparator pulling FFQ low. Flip flop 1141 is prevented from setting FFQ high by holding FFSHT low as a result of an overvoltage signal from reference voltage/overvoltage lockout block 1107 or a gate bias out of window signal from gate bias detect block 1105, as discussed above.

Figure 11K:
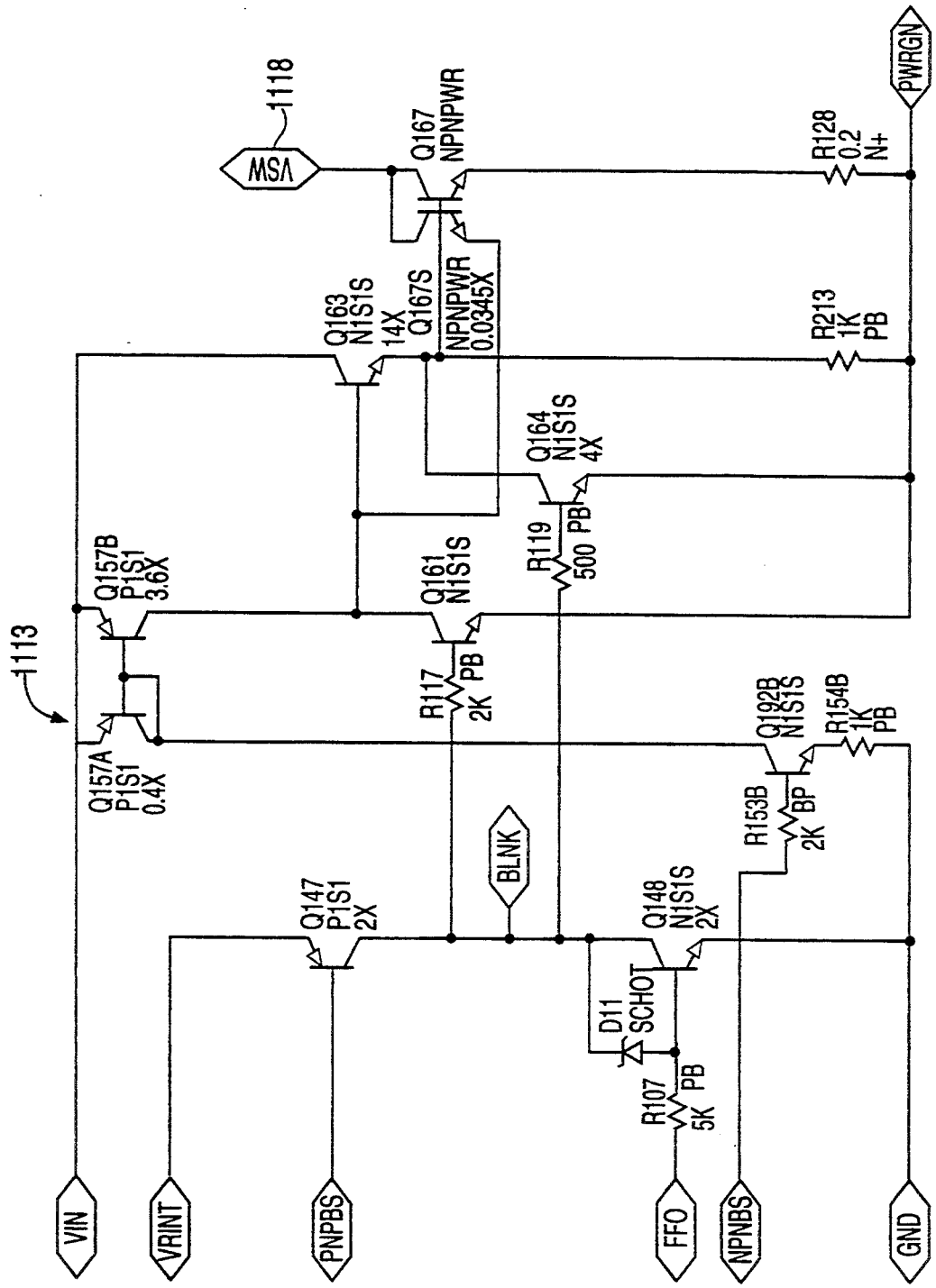
FIG. 11K is a schematic diagram of output stage one block 1113 of FIG. 11A.
Figure 11L:
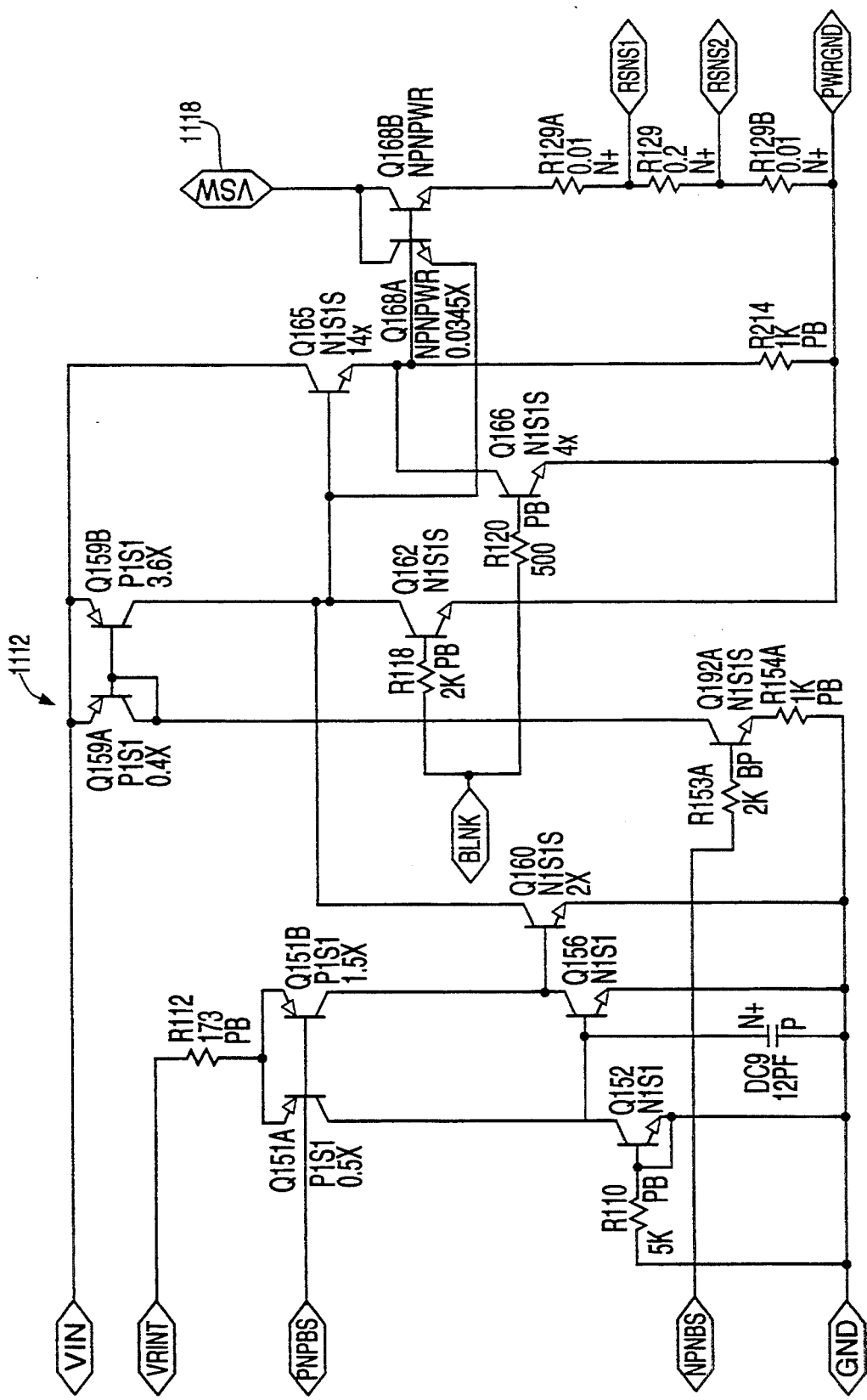
FIG. 11L is a schematic diagram of output stage two block 1112 of FIG. 11A.
Figure 11M:
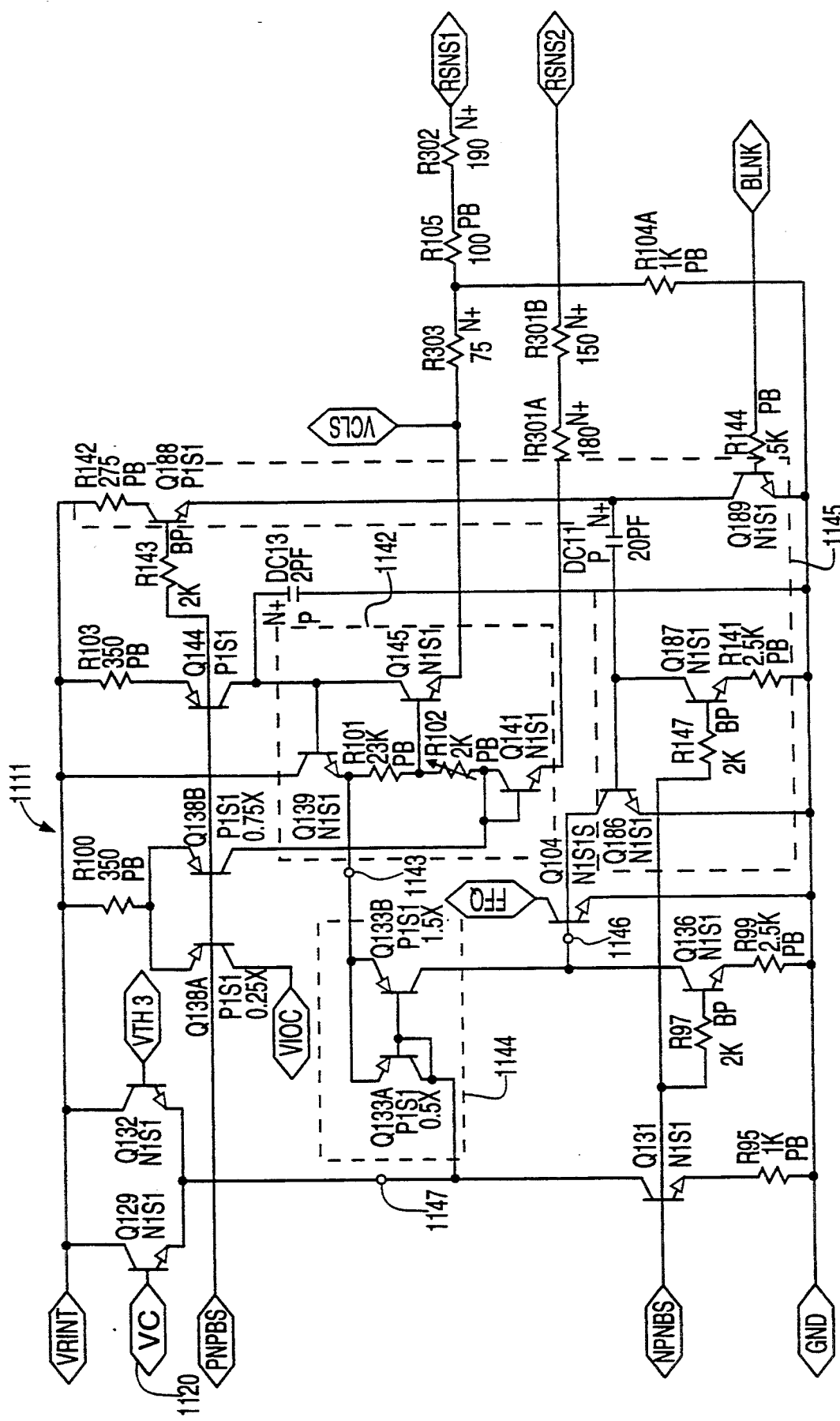
FIG. 11M is a schematic diagram of current sense amplifier block 1111 of FIG. 11A.

The three blocks which have not been discussed up to this point are the output stage one block 1113, output stage two block 1112 and current sense amplifier block 1111. These blocks are shown in FIGS. 11K, 11L and 11M, respectively. Output stage one block 1113, in response to the logic signal on terminal FFQ from logic block 1104, has a driver transistor Q167 which drives switching terminal 1118. Output stage two block 1112 also has a driver transistor Q168B which drives switching terminal 1118 in a similar manner.

In addition to driving circuitry, output stage two block 1112 includes a resistor R129 which is used to sense the current flowing in the switching circuit by monitoring the current flowing in the collector of transistor Q168B. The voltage signal across resistor R129 is used to feed current amplifier 1142 in current sense amplifier block 1111 (FIG. 11M). The output 1143 of amplifier 1142 is taken from the emitter of transistor Q139 and is used to feed one input of comparator 1144 comprising transistors Q133A and Q133B. The other input (1147) of comparator 1144 is taken from the output of output gm stage block 1110: terminal VC 1120. The output of comparator 1144 is tied to terminal FFQ. Comparator 1144 tells the drivers to turn off by putting a low logic signal on terminal FFQ. In other words, the comparator resets the output of flip flop 1141 in logic block 1104.

Also included in current sense amplifier block 1111 is a current spike blanking circuit 1145. The purpose of this circuit is to blank out the current spike which can occur on the primary winding due to parasitic capacitances and stored diode charge when the switching element is closed. Blanking circuit 1145 has an input BLNK which is taken from output stage one block 1113. The signal on BLNK is tied to the signal on the FFQ terminal of block 1113. As a result, when FFQ goes high blanking circuit 1145 causes the base of transistor Q104 to be pulled low so as to divert any signal current coming from the output of comparator 1144 which would cause FFQ to be pulled low. When the switching element is initially closed, parasitic capacitances and stored diode charge can cause current to be fed into input 1143 of comparator 1144. This current can cause comparator 1144 to tell the switching element to prematurely open by prematurely sending a low logic signal to terminal FFQ. The purpose of blanking circuit 1145 is to prohibit such an event from happening for a fixed period of time until the current spike in the switch has passed. Capacitor DC11 fixes the period of time over which the blanking occurs. For the embodiment of current sense amplifier 1111 shown in FIG. 11M, current spike blanking occurs for 750 nanoseconds.

Thus, a first preferred embodiment of a switching voltage regulator control circuit (FIG. 10) incorporating the sampling error amplifier circuit, the load regulation compensation circuit and the gate bias detect circuit of the present invention, as well as an integrated circuit implementation thereof (FIGS. 11A–11M) have been presented. A person of ordinary skill in the art will recognize that there are various ways to implement the first preferred embodiment, only one of which has been shown in FIGS. 11A–11M. Such modifications are within the scope of the present invention.

Figure 12:
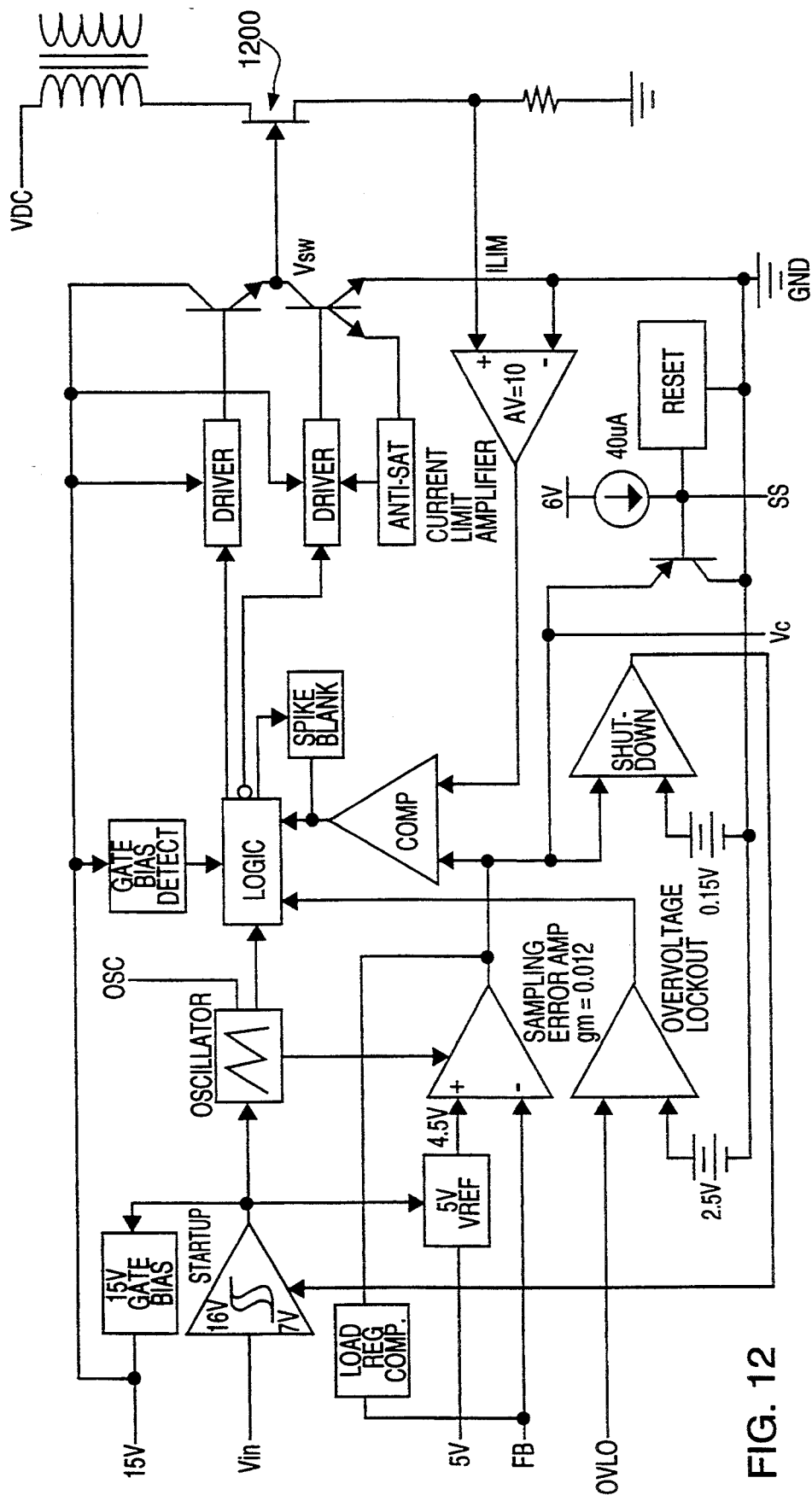
FIG. 12 is a block diagram of a second preferred embodiment of switching voltage regulator control circuit 405 incorporating embodiments of the sampling error amplifier circuit, the load regulation compensation circuit and the gate bias detect circuit of the present invention.

A second preferred embodiment of a switching voltage regulator control circuit incorporating the sampling error amplifier circuit, the load regulation compensation circuit and the gate bias detect circuit of the present invention is shown in FIG. 12. In contrast to the embodiment shown in FIG. 10, this regulator control circuit includes a totem-pole output stage of the type shown in FIG. 6C above. As with the first preferred embodiment, there are various ways to implement the voltage regulator control circuit of FIG. 12. Preferably, the second preferred embodiment is implemented in an integrated circuit using the same circuit configuration as shown in FIGS. 11A–11M, with a few modifications. The blocks which are modified from the embodiments shown in FIGS. 11B–11M are the driver circuits (output stage one block 1113 and output stage two block 1112), gate bias detect block 1105 and the current sense amplifier block 1111. These modified blocks are shown in FIGS. 13A–13D.

Figure 13A:
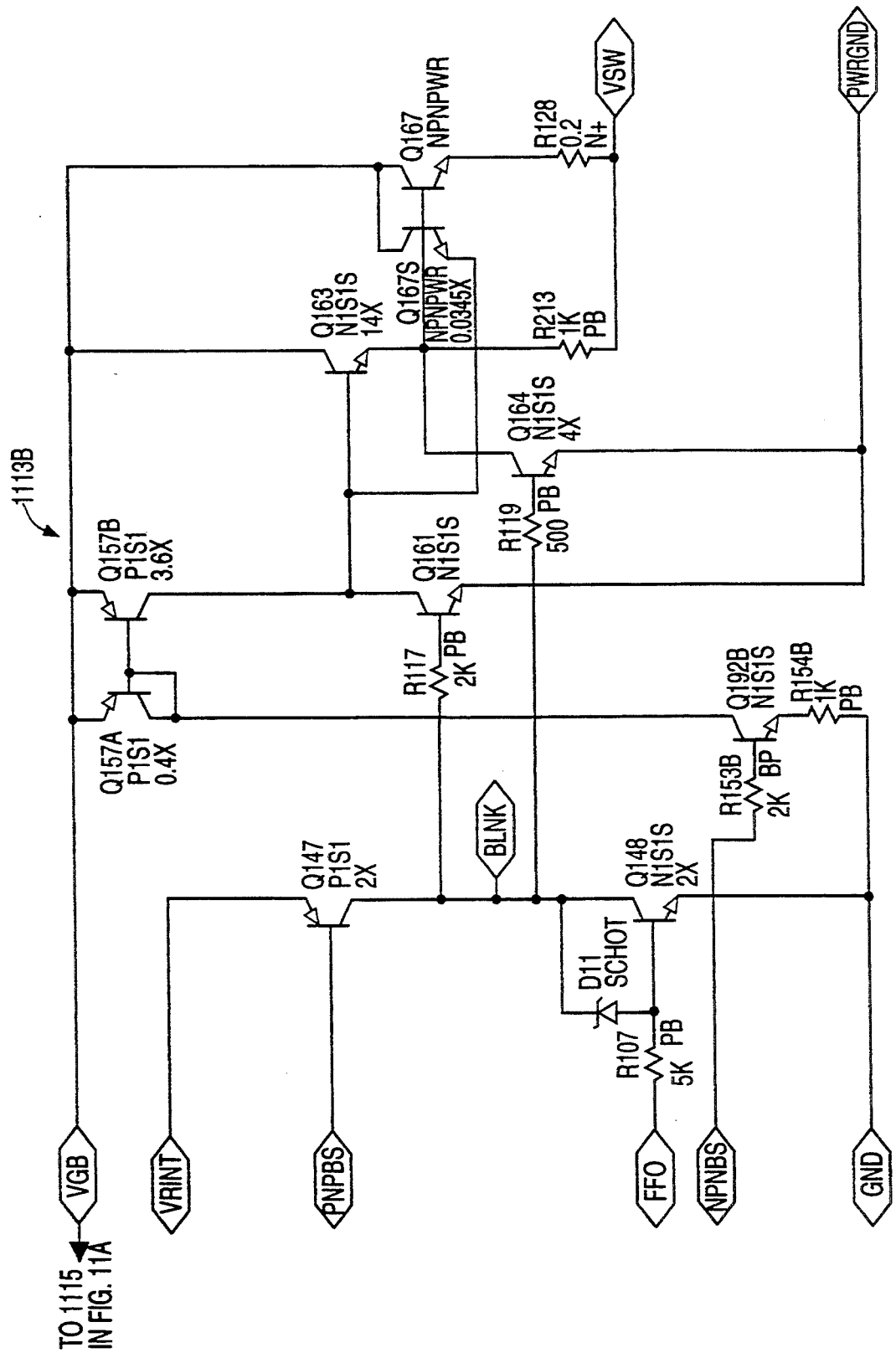
FIG. 13A is a schematic diagram of an output stage one block 1113B of a preferred integrated circuit implementation of the embodiment of switching voltage regulator control circuit 405 shown in FIG. 12.
Figure 13B:
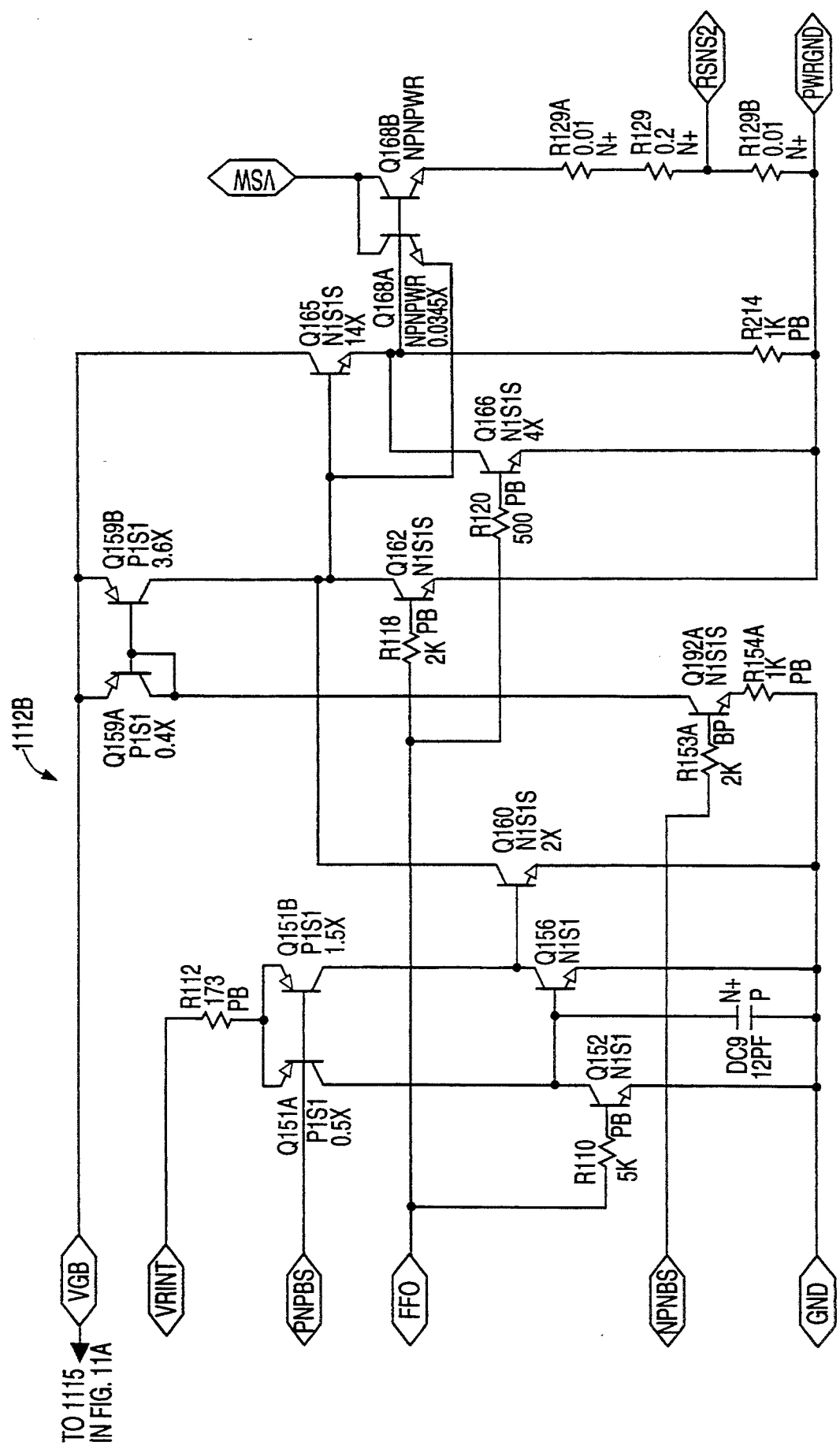
FIG. 13B is a schematic diagram of an output stage two block 1112B of a preferred integrated circuit implementation of the embodiment of switching voltage regulator control circuit 405 shown in FIG. 12.
Figure 13C:
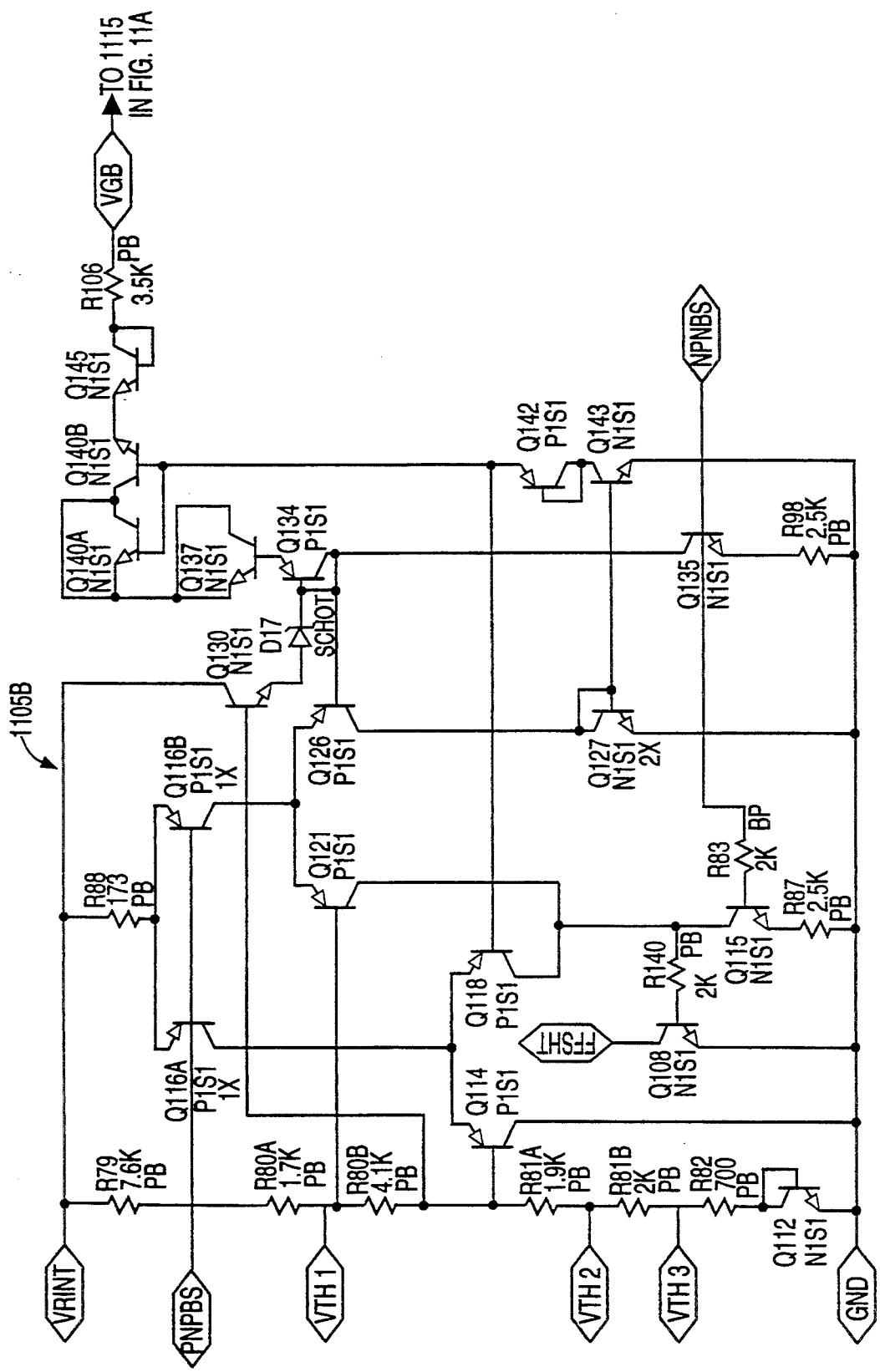
FIG. 13C is a schematic diagram of a gate bias detect block 1105B of a preferred integrated circuit implementation of the embodiment of switching regulator control circuit 405 shown in FIG. 12.
Figure 13D:
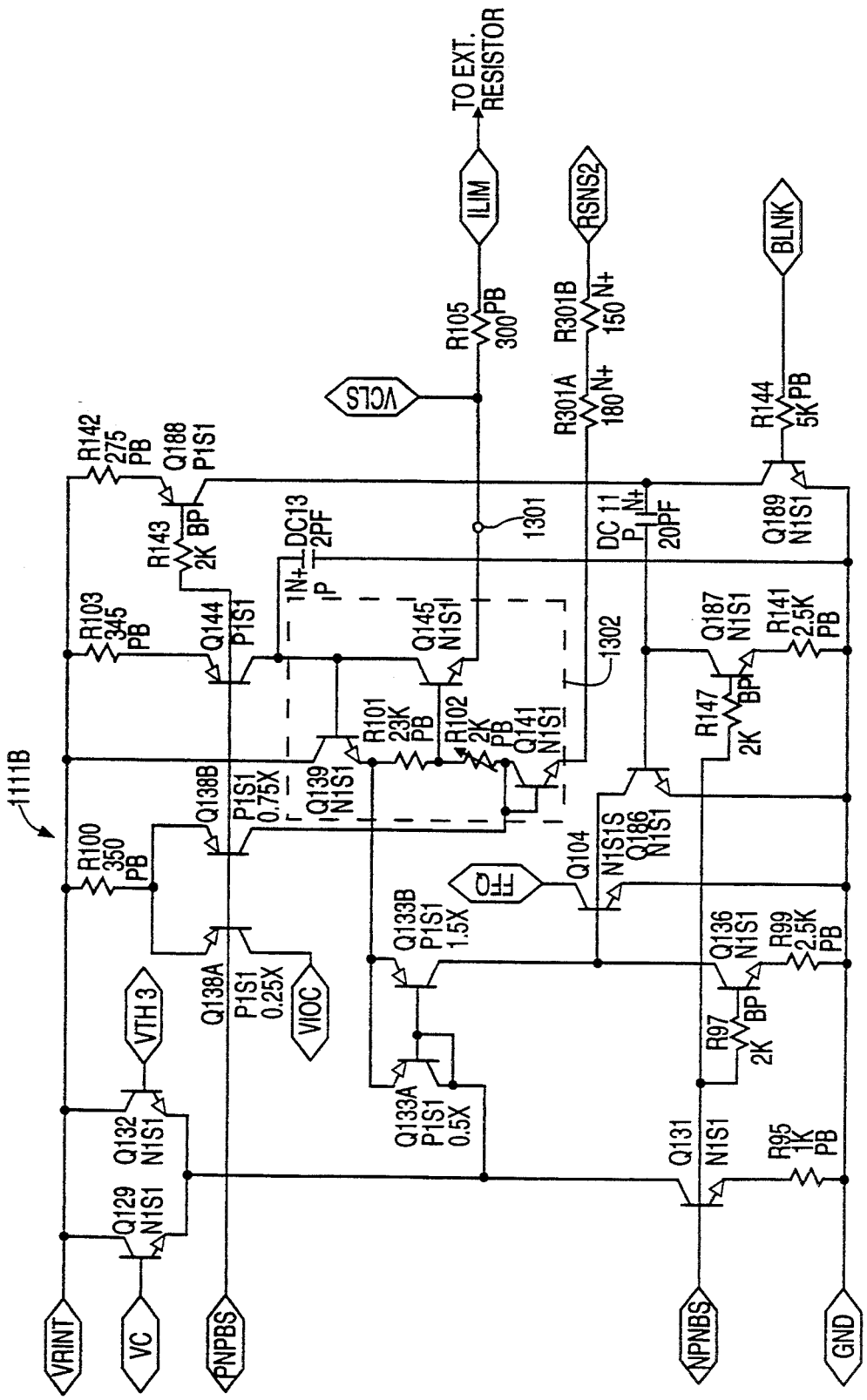
FIG. 13D is a schematic diagram of a current sense amplifier block 1111B of a preferred integrated circuit implementation of the embodiment of switching voltage regulator control circuit 405 shown in FIG. 12.

FIGS. 13A and 13B show a modified output stage one block 1113B and a modified output stage two block 1112B respectively. These output stages are interconnected in a configuration like that shown in FIG. 6C. FIG. 13C shows modified gate bias detect block 1105B. In contrast to the embodiment of the gate bias detect circuit shown in FIG. 11E, the present embodiment detects the voltage on terminal VGB which corresponds to the output of the 15 V regulator, in accordance with FIG. 6C, as opposed to the voltage on terminal VSW. FIG. 13D shows modified current sense amplifier block 1111B. In contrast to the embodiment of the current sense amplifier block shown in FIG. 11M, the positive terminal 1301 of the gain of ten amplifier 1302 is connected to an external resistor (not shown), in accordance with FIG. 12. This allows the user to program maximum switch current to any desired level.

Thus, a second preferred embodiment of a switching voltage regulator control circuit (FIG. 12) incorporating the sampling error amplifier circuit, the load regulation compensation circuit and the gate bias detect circuit of the present invention, as well as an integrated circuit implementation thereof, have been presented. Of course, one of ordinary skill in the art could implement the embodiment of switching voltage regulator shown in FIG. 12 using circuit configurations other than those shown in FIGS. 11 and 13A–13D. Such modifications are within the scope of the present invention, which is limited only by the claims which follow.

What is claimed is:

1. A circuit for use in a switching voltage regulator circuit, the switching voltage regulator circuit having a switching element, control circuitry which turns the switching element on and off, a transformer-coupled output circuit, and a feedback circuit for providing a magnetic flux-sensed feedback signal indicative of the switching voltage regulator circuit output voltage, the circuit comprising:

- a feedback terminal for accepting the magnetic flux-sensing feedback signal;
- means for generating, from at least one of (1) the magnetic flux-sensed feedback signal and (2) current conducted by the switching element, a first signal which varies during an on-off cycle of the switching element, wherein the means for generating the first signal comprises error amplifier circuitry having an input connected to the feedback terminal;
- means for detecting a particular value of the first signal at a discrete point in the on-off cycle of the switching element, wherein the particular value of the first signal is indicative of load current being provided by the switching voltage regulator, and wherein the means for detecting a particular value of the first signal comprises sample and hold circuitry having an output connected to the switching element, the error amplifier circuitry providing an error signal indicative of a difference between the feedback signal and a reference signal; and
- means connected to the feedback terminal for applying a current signal to the feedback terminal which is controlled by the particular value of the first signal so as to compensate the magnetic flux-sensed feedback signal for load-current dependent effects of parasitic impedances in the transformer-coupled output circuit.

2. The circuit of claim 1, wherein the error signal is detected by the sample and hold circuitry for a predetermined period of time in the on-off cycle of the switching element, the point at which the predetermined period of time occurs in the on-off cycle being determined relative to the point at which the switching element turns on.

3. The circuit of claim 1, wherein the error signal is detected by the sample and hold circuitry for a predetermined period of time in the on-off cycle of the switching element, the point at which the predetermined period of time occurs in the on-off cycle being determined relative to the point at which energy stored in a transformer core in the output circuit is depleted.

4. The circuit of claim 3 wherein the means for applying a current signal to the feedback terminal comprises:

- a PNP transistor having an emitter coupled to a first bias voltage, a base coupled to an output of the error amplifier, and a collector coupled to ground;
- a first NPN transistor having a collector coupled to a second bias voltage and a base coupled to the emitter of the PNP transistor;
- second and third NPN transistors configured as a current mirror, wherein emitters of the second and third NPN transistors are coupled to ground, a collector and a base of the second NPN transistor are coupled to the emitter of the first NPN transistor and to a base of the third NPN transistor, and a collector of the third NPN transistor is coupled to the feedback terminal.

5. The circuit of claim 1 wherein the means for applying a current signal to the feedback terminal comprises:

- a first transistor coupled to the error amplifier and operable to provide a reference current indicative of the error signal; and
- a pair of transistors configured as a current mirror having reference and reflected current paths, wherein the reference current path is coupled to the first transistor to conduct the reference current and the reflected current path is coupled to the feedback terminal.

6. A circuit for use in a switching voltage regulator circuit, the switching voltage regulator circuit having a switching element, control circuitry which turns the switching element on and off, a transformer-coupled output circuit, and a feedback circuit for providing a magnetic flux-sensed feedback signal indicative of the switching voltage regulator circuit output voltage, the circuit comprising:

- a feedback terminal for accepting the magnetic flux-sensed feedback signal;
- an error amplifier having an input connected to the feedback terminal and an output connected to the control circuitry for providing an error signal indicative of a difference between the feedback signal and a reference signal;
- circuitry for sensing the error signal at a discrete time in an on-off cycle of the switching element; and
- a load compensation circuit connected to the feedback terminal for conducting a current from the feedback terminal in response to changes in the sensed error signal so as to compensate for load-current dependent effects of parasitic impedances in the transformer-coupled output circuit, the load compensation circuitry including (1) a first transistor coupled to the output of the error amplifier, wherein the first transistor is operable to provide a reference current indicative of the error signal; and (2) a pair of transistors configured as a current mirror having reference and reflected current paths, wherein the reference current path is coupled to the first transistor to conduct the reference current and the reflected current path is coupled to the feedback terminal.

7. A method for use in a switching voltage regulator circuit, the switching voltage regulator circuit having a switching element, control circuitry which turns the switching element on and off, a transformer-coupled output circuit, and a feedback circuit for providing a magnetic flux-sensed feedback signal indicative of the switching voltage regulator circuit output voltage, the method comprising the steps of:

- generating, from at least one of (1) the magnetic flux-sensed feedback signal and (2) current conducted by the switching element, a first signal which varies during an on-off cycle of the switching element by sensing switch current through the switching element and generating a voltage signal proportional to the switch current;
- detecting a particular value of the first signal at a discrete point in the on-off cycle of the switching element by detecting a peak value of the voltage signal in an on-off cycle of the switching element, wherein the particular value of the first signal is indicative of load current being provided by the switching voltage regulator; and
- applying a current signal to the feedback terminal which is controlled by the particular value of the first signal so as to compensate the magnetic flux-sensed feedback signal for load-current dependent effects of parasitic impedances in the transformer-coupled output circuit.

8. A circuit for use in a switching voltage regulator circuit, the switching voltage regulator circuit having a switching element, control circuitry which turns the switching element on and off, a transformer-coupled output circuit, and a feedback circuit for providing a magnetic flux-sensed feedback signal indicative of the switching voltage regulator circuit output voltage, the circuit comprising:

a feedback terminal for accepting the magnetic flux-sensing feedback signal;

means for generating, from at least one of (1) the magnetic flux-sensed feedback signal and (2) current conducted by the switching element, a first signal which varies during an on-off cycle of the switching element;

means for detecting a particular value of the first signal at a discrete point in the on-off cycle of the switching element, wherein the particular value of the first signal is indicative of load current being provided by the switching voltage regulator; and means connected to the feedback terminal for applying a current signal to the feedback terminal which is controlled by the particular value of the first signal so as to compensate the magnetic flux-sensed feedback signal for load-current dependent effects of parasitic impedances in the transformer-coupled output circuit, wherein the control circuitry which turns the switching element on and off includes an output driver circuit comprising one or more transistors for supplying switch current to the switching element, and the means for generating the first signal comprises a sense resistor coupled to conduct current through the switching element; and wherein the means for detecting a particular value of the first signal comprises a peak detector which senses peak voltage across the sense resistor during an on-off cycle of the switching element.

9. A method for use in a switching voltage regulator circuit, the switching voltage regulator circuit having a switching element, control circuitry which turns the switching element on and off, a transformer-coupled output circuit, and a feedback circuit for providing a magnetic flux-sensed feedback signal indicative of the switching voltage regulator circuit output voltage, the method comprising the steps of:

generating, from at least one of (1) the magnetic flux-sensed feedback signal and (2) current conducted by the switching element, a first signal which varies during an on-off cycle of the switching element by generating an error signal indicative of a difference between the feedback signal and a reference signal;

detecting a particular value of the first signal at a discrete point in the on-off cycle of the switching element by sampling the error signal at a discrete point in the on-off cycle, wherein the particular value of the first signal is indicative of load current being provided by the switching voltage regulator; and applying a current signal to the feedback terminal which is controlled by the particular value of the first signal so as to compensate the magnetic flux-sensed feedback signal for load-current dependent effects of parasitic impedances in the transformer-coupled output circuit.

10. The method of claim 9, wherein the error signal is sampled just prior to the time the switching element switches on.

11. The method of claim 9, wherein the error signal is sampled just prior to the time energy stored in a core of the transformer has dissipated.

12. A circuit for providing load current compensated output regulation in a switching regulator, the switching regulator including output circuitry coupled between a secondary winding of a transformer and an output of the switching regulator, the circuit comprising:

a feedback terminal for accepting a magnetic flux-sensed feedback signal indicative of a voltage at the output of the switching regulator;

an error amplifier having an input coupled to the feedback terminal and an output coupled to circuitry for switching on and off a primary current through a primary winding of the transformer, the error amplifier producing an error signal indicative of a difference between the feedback signal and a reference signal;

circuitry for sensing the error signal at a discrete point in an on-off switching cycle of the primary current; and compensation circuitry having an input coupled to the sensed error signal and an output coupled to the feedback terminal, the compensation circuitry adjusting the magnitude of the feedback signal to compensate for parasitic loses caused by the current in the output circuitry, the compensation circuitry including:

a PNP transistor having an emitter coupled to a first bias voltage, a base coupled to an output of the error amplifier, and a collector coupled to ground;

a first NPN transistor having a collector coupled to a second bias voltage and a base coupled to the emitter of the PNP transistor;

second and third NPN transistors configured as a current mirror, wherein emitters of the second and third NPN transistors are coupled to ground, a collector and a base of the second NPN transistor are coupled to the emitter of the first NPN transistor and to a base of the third NPN transistor, and a collector of the third NPN transistor is coupled to the feedback terminal.

* * * * *

UNITED STATES PATENT AND TRADEMARK OFFICE
CERTIFICATE OF CORRECTION

PATENT NO. : 5,438,499
DATED : August 1, 1995
INVENTOR(S) : Anthony K. Bonte and Carl T. Nelson It is certified that error appears in the above-indentified patent and that said Letters Patent is hereby corrected as shown below:

| Column | Line | |
|--------|-------|---|
| 11 | 32-33 | Change "diode/-capacitor" to -- diode/capacitor --. |
| 15 | 32 | Delete "an" before "on". |
| 18 | 2 | Insert -- volts -- before "each". |

Signed and Sealed this

Seventeenth Day of August, 1999

Attest:

Q. TODD DICKINSON

Attesting Officer

Acting Commissioner of Patents and Trademarks